United States Patent
Yamagami et al.

(10) Patent No.: US 10,778,110 B2
(45) Date of Patent: Sep. 15, 2020

(54) DC-DC POWER CONVERTER

(71) Applicants: Nissan Motor Co., Ltd., Yokohama-shi, Kanagawa (JP); Virginia Tech Intellectual Properties, Inc., Blacksburg, VA (US)

(72) Inventors: Shigeharu Yamagami, Kanagawa (JP); Khai Doan The Ngo, Blacksburg, VA (US)

(73) Assignees: Nissan Motor Co., Ltd., Yokohama (JP); Virginia Tech Intellectual Properties, Inc., Blacksburg, VA (US)

(*) Notice: Subject to any disclaimer, the term of this patent is extended or adjusted under 35 U.S.C. 154(b) by 0 days.

(21) Appl. No.: 15/767,373

(22) PCT Filed: Oct. 13, 2015

(86) PCT No.: PCT/US2015/055338
§ 371 (c)(1),
(2) Date: Apr. 11, 2018

(87) PCT Pub. No.: WO2017/065750
PCT Pub. Date: Apr. 20, 2017

(65) Prior Publication Data
US 2018/0301989 A1    Oct. 18, 2018

(51) Int. Cl.
*H02M 3/337* (2006.01)
*H02M 3/335* (2006.01)
(Continued)

(52) U.S. Cl.
CPC ....... *H02M 3/337* (2013.01); *H02M 3/33561* (2013.01); *H02M 3/33576* (2013.01);
(Continued)

(58) Field of Classification Search
CPC ............ H02M 3/335; H02M 3/33561; H02M 3/33576; H02M 3/337
(Continued)

(56) References Cited

U.S. PATENT DOCUMENTS 6,278,626 B1 *  8/2001  Teichmann ......... H02M 7/4826
                                                    363/135
6,548,985 B1 *  4/2003  Hayes .................. H02J 7/022
                                                    320/108
(Continued)

FOREIGN PATENT DOCUMENTS

EP    2 518 879 A2    10/2012

OTHER PUBLICATIONS

Mweene et al., "A 1 kW 500 kHz Front-End Converter for a Distributed Power Supply System", IEEE Transactions on Power Electronics, Jul. 1991, pp. 398-407, vol. 6 No. 3, IEEE, US.
(Continued)

*Primary Examiner* — Thienvu V Tran
*Assistant Examiner* — Nusrat Quddus
(74) *Attorney, Agent, or Firm* — Global IP Counselors, LLP

(57) ABSTRACT

A power converter is basically provided with at least three switching circuits, at least one power source, at least one load, and a resonant circuit. Input terminals of the switching circuits are connected to either the at least one power source or the at least one load, and output terminals of the switching circuits are electrically serially connected to the resonant circuit to form a closed circuit.

19 Claims, 18 Drawing Sheets

(51) Int. Cl.
  *H02M 3/00* (2006.01)
  *H02M 1/00* (2006.01)
  *H02M 7/483* (2007.01)

(52) U.S. Cl.
  CPC .... *H02M 3/005* (2013.01); *H02M 2001/0058* (2013.01); *H02M 2001/0077* (2013.01); *H02M 2007/4835* (2013.01); *Y02B 70/1425* (2013.01); *Y02B 70/1433* (2013.01); *Y02B 70/1491* (2013.01)

(58) Field of Classification Search
  USPC ..................................... 363/17, 37, 125–129
  See application file for complete search history.

(56) References Cited

U.S. PATENT DOCUMENTS

| | | | | |
|---|---|---|---|---|
| 2009/0085543 | A1* | 4/2009 | Sigamani | H02M 3/3376 323/282 |
| 2011/0007527 | A1* | 1/2011 | Liu | H02M 3/33561 363/21.02 |
| 2012/0014138 | A1 | 1/2012 | Ngo et al. | |
| 2012/0262955 | A1* | 10/2012 | Yan | H02M 3/3376 363/21.02 |
| 2012/0268976 | A1* | 10/2012 | Yan | H02M 7/219 363/126 |
| 2012/0275197 | A1* | 11/2012 | Yan | H02M 3/33592 363/21.02 |
| 2013/0208512 | A1* | 8/2013 | Rojas | H02M 3/335 363/17 |
| 2013/0293203 | A1* | 11/2013 | Chen | H02M 1/084 323/234 |
| 2013/0301308 | A1* | 11/2013 | Hosotani | H02M 3/3381 363/21.03 |
| 2014/0185330 | A1* | 7/2014 | Huang | H02M 3/3376 363/21.02 |

OTHER PUBLICATIONS

Kim et al., "Idling Port Isolation Control of Three-Port Bidirectional Converter for EVs", IEEE Transactions on Power Electronics, May 2012, pp. 2495-2506, vol. 27 No. 5, IEEE, US.

* cited by examiner

DC-DC POWER CONVERTER

BACKGROUND

CROSS-REFERENCE TO RELATED APPLICATION

This application is a U.S. National stage of International Application No. PCT/US2015/055338, filed Oct. 13, 2015.

Field of the Invention

The present invention generally relates to a power converter.

Background Information

A power system that can be used for powering a vehicle, such as an electric vehicle or a hybrid electric vehicle, is conventionally known in the art. For example, in the vehicle, a dual-voltage power system is used, for example, in which the 12V system to feed the electric load, such as head and tail lights, heating fans, audio system and so forth, and the high voltage system to feed the traction inverter, motor and so forth, are present. With the dual-voltage power system, it is convenient to transfer energy between the two voltage systems. For this purpose, a power converter is installed in the vehicle.

Specifically, a phase-shift type full bridge converter is provided in "A 1 kW 500 kHz Front-End Converter for a Distributed Power Supply System" by Mweene et al., IEEE Transactions on Power Electronics, vol. 6, no. 3, pp. 398-407, July 1991 (hereinafter "Non-Patent Literature 1"), for example. Also, a three-port converter is provided in "Idling Port Isolation Control of Three-Port Bidirectional Converter for EVs" by Kim et al., IEEE Transactions on Power Electronics, vol. 27, no. 5, pp. 2495-2506, May 2012 (hereinafter "Non-Patent Literature 2"), for example. With this three-port converter of Non-Patent Literature 2, the power flow to a predetermined port can be prevented to idle the port.

SUMMARY

With the converter of Non-Patent Literature 1, the power flow between the power sources and the loads is controllable. However, with this converter, it is difficult to reduce the size and cost of the converter. On the other hand, with the converter of Non-Patent Literature 2, the number of parts of the converter can be reduced. However, with this converter, a complex switching action is required to idle a port, and it is difficult to prevent an energy loss at the idling port, which in turn requires the component design to take the heat generation due to the loss into account. Thus, with this converter, it is also difficult to reduce the size and cost of the converter.

One aspect is to provide a power converter with which the size and cost thereof can be reduced.

In view of the state of the known technology and in accordance with a first aspect, a power converter includes at least three switching circuits, at least one power source, at least one load, and a resonant circuit, input terminals of the switching circuits being connected to either the at least one power source or the at least one load, and output terminals of the switching circuits being electrically serially connected to the resonant circuit to form a closed circuit.

With the power converter according to the first aspect, the power between a plurality of ports can be controlled as desired. Thus, it is possible to provide a power converter with which the number of parts can be reduced and the size and the cost thereof can be reduced.

In accordance with a second aspect, the power converter according to the first aspect, wherein the sum of the fundamental component of voltage waveform generated by a set of the switching circuits that is connected to the at least one power source is substantially equal to the sum of the fundamental component of voltage waveform applied to a set of the switching circuits that is connected to the at least one load.

With the power converter according to the second aspect, the power between a plurality of ports can be controlled as desired by making the sum of the fundamental component of the at least one power source selectively filtered by the resonant circuit to be equal to the sum of fundamental component of the at least one load.

In accordance with a third aspect, the power converter according to the first or second aspect, wherein the frequencies of the voltage waveforms are substantially equal to the resonant frequency of the resonant circuit.

With the power converter according to the third aspect, the fundamental component can be selectively obtained by making the frequencies of the voltage waveforms to be near the resonant frequency of the resonant circuit.

In accordance with a fourth aspect, the power converter according to any one of first to third aspects, wherein the phases of the voltage waveforms are substantially equal to each other.

With the power converter according to the fourth aspect, the sum of the fundamental component of the at least one power source and the sum of the fundamental component of the at least one load can be made equal to each other by making the voltage waveforms to be the same phase.

In accordance with a fifth aspect, the power converter according to any one of the first to fourth aspects, wherein at least one of the output terminals of the switching circuits is serially connected to the closed circuit via an isolation transformer.

With the power converter according to the fifth aspect, a desired output terminal can be electrically isolated from the other output terminal by connecting at least one pair of output terminals via the transformer.

In accordance with a sixth aspect, the power converter according to any one of the first to fifth aspects, wherein the characteristic impedance of the resonant circuit is higher than the total effective load resistance value serially connected to the closed circuit.

With the power converter according to the sixth aspect, the fundamental component of the voltage waveform can be effectively filtered by the resonant circuit by making the characteristic impedance of the resonant circuit to be higher than the total effective load resistance value.

In accordance with a seventh aspect, the power converter according to any one of the first to sixth aspects, wherein at least one of the output terminals of the switching circuits is electrically shorted via a switching element of an upper arm or a switching element of a lower arm in the switching circuit.

With the power converter according to seventh aspect, the at least one of the output terminals of the switching circuits is electrically shorted via the switching element of the upper arm or the switching element of the lower arm in the switching circuit. Thus, the power input to the shorted output terminal and the power output from the shorted output terminal can be zero, thereby decreasing the loss at the switching element.

In accordance with an eighth aspect, the power converter according to the seventh aspect, wherein the at least one of the output terminals of the switching circuits is electrically shorted alternately via the switching element of the upper arm and the switching element of the lower arm in the switching circuit.

With the power converter according to the eighth aspect, the at least one of the output terminals of the switching circuits is electrically shorted alternately via the switching element of the upper arm and the switching element of the lower arm in the switching circuit. Thus, the excessive temperature increase at the switching element used for the short circuit can be prevented.

In accordance with a ninth aspect, the power converter according to the seventh or eighth aspect, wherein at least one of the switching circuits includes a full bridge circuit.

With the power converter according to the ninth aspect, the output terminal of the switching circuit can be easily electrically shorted by making the at least one of the switching circuits include the full bridge circuit.

In accordance with a tenth aspect, the power converter according to any one of first to ninth aspect further includes a calculation unit configured to calculate a load resistance value based on the applied voltage to the at least one load and the average current to the at least one load, and a control unit configured to determine the duty ratio of the switching circuits based on the load resistance value, the power source voltage value and the target voltage value to the at least one load.

With the power converter according to tenth aspect, the power converter includes the calculation unit configured to calculate the load resistance value based on the applied voltage to the at least one load and the average current to the at least one load, and the control unit configured to determine the duty ratio of the switching circuits based on the load resistance value, the power source voltage value and the target voltage value to the at least one load. Thus, the power between a plurality of ports can be controlled as desired.

BRIEF DESCRIPTION OF THE DRAWINGS

Referring now to the attached drawings which form a part of this original disclosure.

DETAILED DESCRIPTION OF EMBODIMENTS

Figure 1:
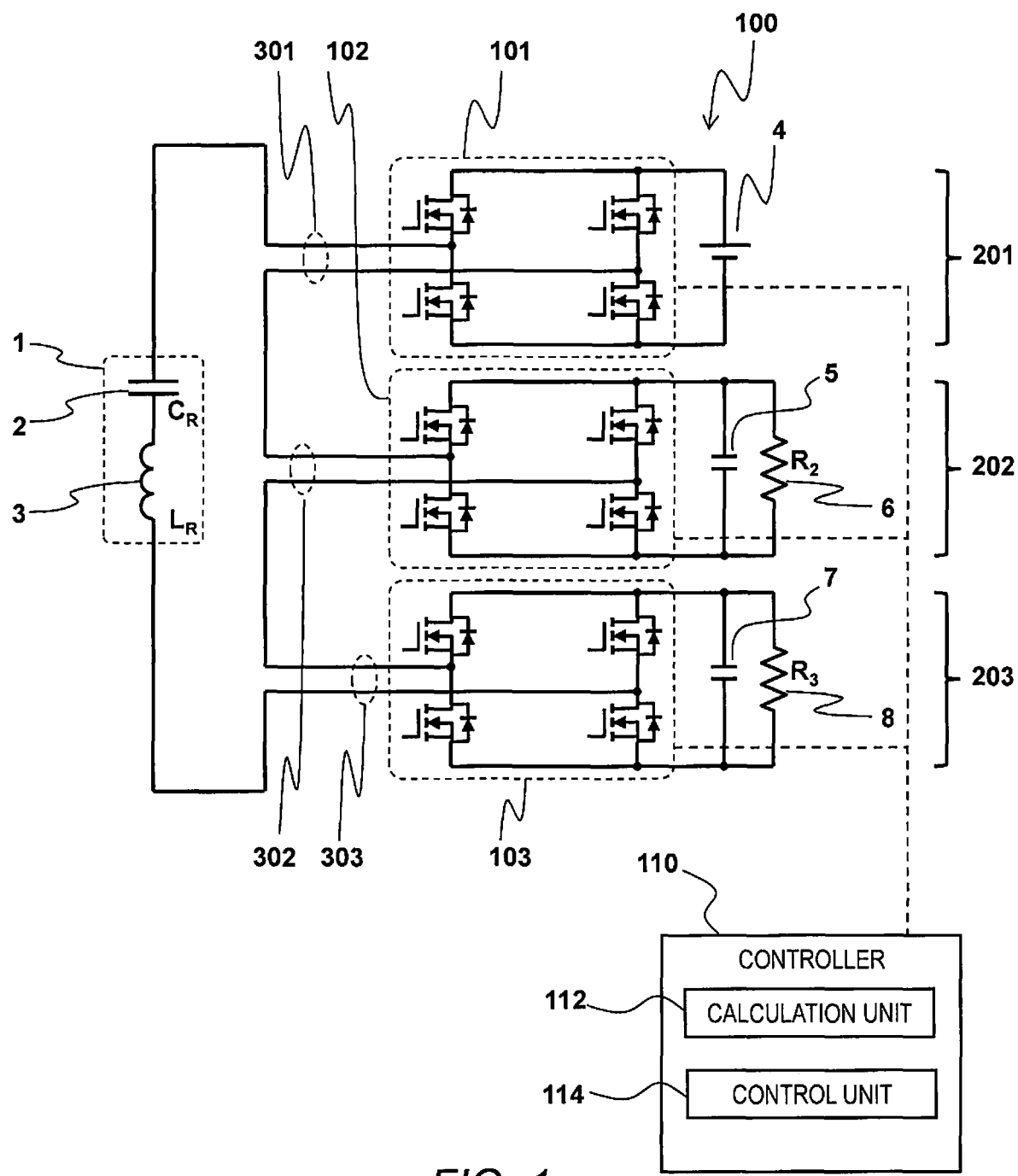
FIG. 1 is a circuit diagram illustrating a circuit structure of a power converter in accordance with a first embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

First Embodiment

Referring to FIGS. 1 to 18, and Tables 1 and 2, a power converter 100 is illustrated in accordance with a first embodiment. FIG. 1 is a circuit diagram illustrating a circuit structure of the power converter 100. As shown in FIG. 1, the power converter 100 is the so-called multi-port converter with three ports, such as a first port 201, a second port 202, and a third port 203. The first port 201 includes a first switching circuit 101 and a first power source 4. The second port 202 includes a second switching circuit 102, a second smoothing capacitor 5 and a second load resistance 6. The third port 203 includes a third switching circuit 103, a third smoothing capacitor 7 and a third load resistance 8. As illustrated in FIG. 1, each of the first, second and third switching circuits 101, 102 and 103 includes four switching elements, such as MOSFET or any other elements as needed and/or desired. In the illustrated embodiment, each of the first, second and third switching circuits 101, 102 and 103 includes a full bridge circuit. However, the first, second and third switching circuits 101, 102 and 103 can be a different type of circuit, such as a half bridge circuit.

The power converter 100 also includes a controller 110 having a calculation unit 112 and a control unit 114. The controller 110 controls the first, second and third switching circuits 101, 102 and 103, respectively, using the pulse width modulation (PWM). In particular, in the illustrated embodiment, the controller 110 controls the first, second and third switching circuits 101, 102 and 103, respectively, using the phase shifted PWM. The controller 110 basically determines the duty ratios of the first, second and third switching circuits 101, 102 and 103, respectively, to obtain desired output voltages at the second and third load resistances 6 and 8 relative to a predetermined input voltage at the first power source 4. The operation of the controller 110 will be explained later.

As can be appreciated by one skilled in the art, the controller 110 preferably includes at least one microcomputer with a control program that controls the components of the controller 110 as discussed below. Thus, the microcomputer or microcomputers can be configured and programmed to embody any or all of the calculation unit 112 and the control unit 114. The controller 110 includes other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the controller 110 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. In addition, although several of the components of the controller 110 are described as modules or units, these components need not be individual or separate components, and one component or module can perform the operations of multiple components or modules discussed herein. Also, each module can include a microcontroller as discussed above or multiple modules can share one or more microcontrollers.

The power converter 100 can be used for powering a vehicle, for example. In the illustrated embodiment, as illustrated in FIG. 1, the power converter 100 is a DC-DC converter with the first power source 4 as a single input and the second and third load resistances 6 and 8 as multiple (a pair of) outputs. However, the number of input of the power converter 100 can be different as desired and/or needed, and the number of output of the power converter 100 can be different as desired and/or needed. As illustrated in FIG. 1, the first power source 4 is a DC power source, such as a battery. However, as understood in the art, with the power convertor 100, power can be delivered from its ultimate source as AC power. In this case, the delivered AC power is then transformed into DC power using a rectifier arrangement or any other suitable arrangement. Then, the transformed DC power can be applied to the power converter 100 as an input. Also, as understood in the art, the outputs of the power converter 100 can be connected to the dual voltage power system installed in the vehicle, for example.

As illustrated in FIG. 1, with the power converter 100, a first output terminal 301 of the first switching circuit 101, a second output terminal 302 of the second switching circuit 102, a third output terminal 303 of the third switching circuit 103 and a series resonant circuit 1 are connected in series with respect to each other to form a closed circuit. The series resonant circuit 1 includes a resonant capacitor 2 and a resonant inductor 3.

Figure 2:
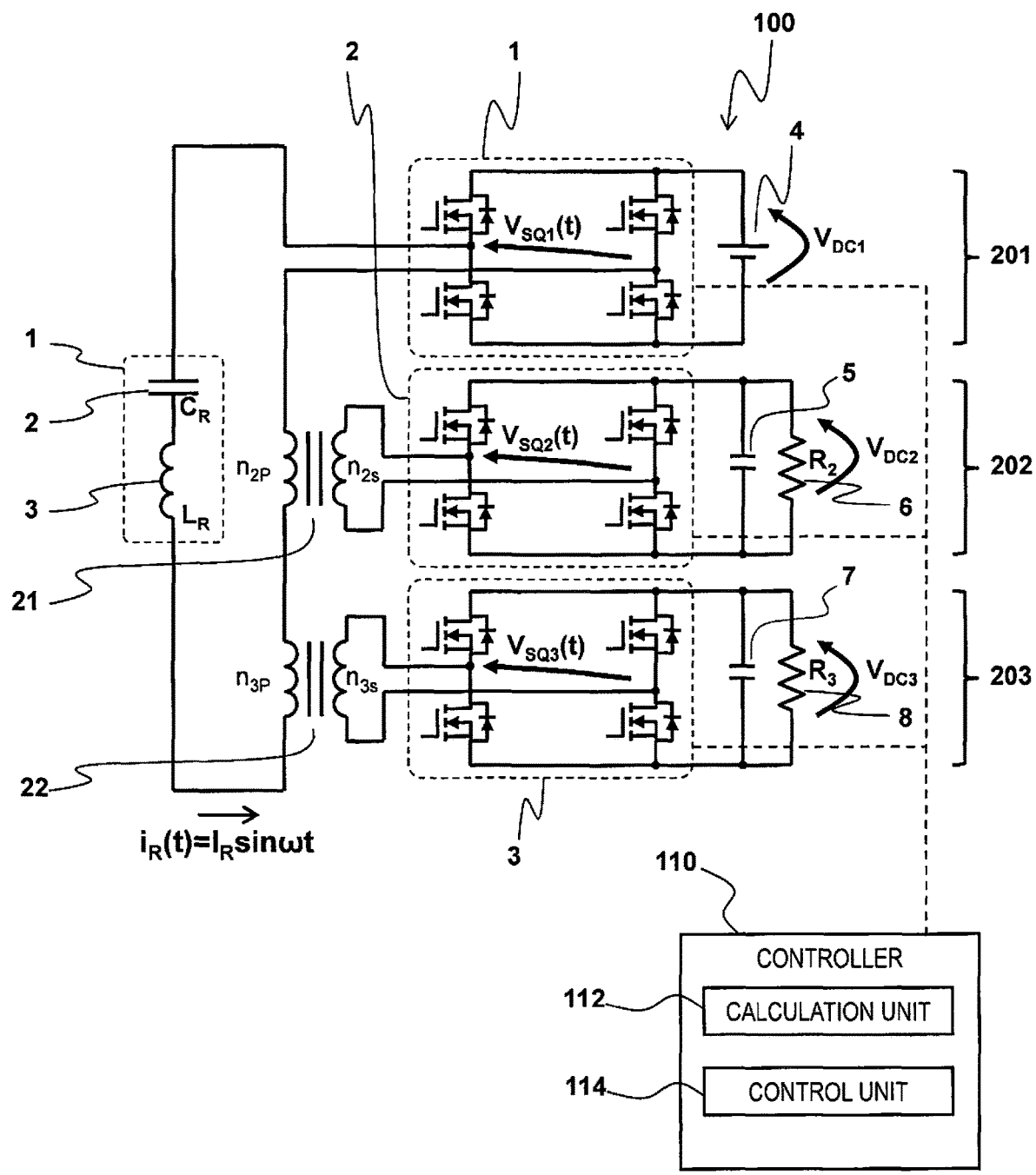
FIG. 2 is a circuit diagram illustrating a circuit structure that is identical to the circuit structure illustrated in FIG. 1, except that second and third isolation transformers are added to second and third ports, respectively.

Referring now to FIG. 2, the operation of the power converter 100 will be explained. FIG. 2 illustrates a circuit structure that is identical to the circuit structure illustrated in FIG. 1, except that second and third isolation transformers 21 and 22 are added to the second and third ports 202 and 203, respectively. As shown in FIG. 2, the numbers of turns of the second isolation transformer 21 are $n_{2P}$ and $n_{2S}$, respectively, while the numbers of turns of the third isolation transformer 22 are $n_{3P}$ and $n_{3S}$, respectively. With the configuration shown in FIG. 2, the first, second and third ports 201, 202 and 203 are electrically isolated with respect to each other.

Referring to FIG. 2, the operation of the power converter 100 will be explained by taking the turns ratios of the second and third isolation transformers 21 and 22 into account. The circuit configuration shown in FIG. 1 is achieved by setting the numbers of turns shown FIG. 2 as follows: $n_{2P}=n_{2S}$ and $n_{3P}=n_{3S}$.

In FIG. 2, $V_{DC1}$ represents the voltage of the first power source 4, $R_2$ represents the resistance value of the second load resistance 6, $V_{DC2}$ represents the voltage applied to the second load resistance 6, $R_3$ represents the resistance value of the third load resistance 8, and $V_{DC3}$ represents the voltage applied to the third load resistance 8. Also, in FIG. 2, $v_{SQ1}(t)$, $V_{SQ2}(t)$ and $v_{SQ3}(t)$ represent the differential voltages of the output terminals of the first, second and third ports 201, 202 and 203, respectively. Furthermore, in FIG. 2, $i_R(t)$ represents the current that flows through the series resonant circuit 1.

Figure 3:
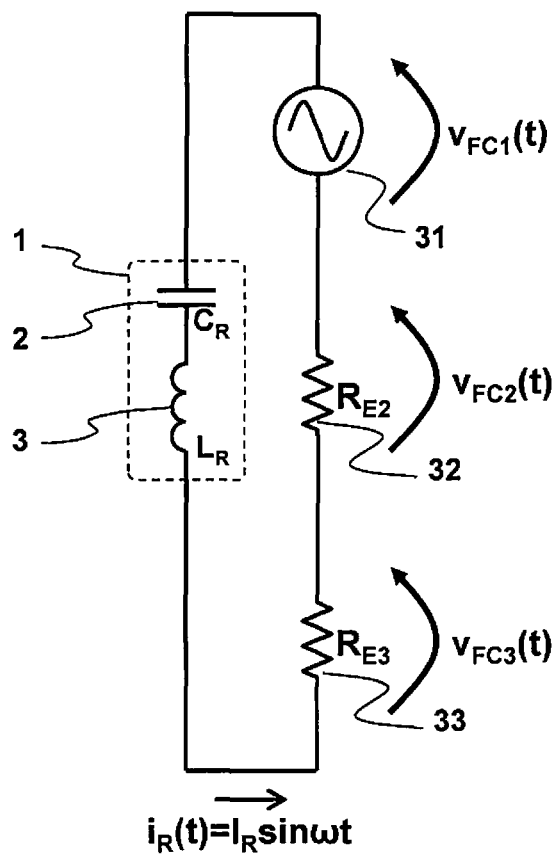
FIG. 3 is a circuit diagram illustrating an AC equivalent circuit of the circuit structure illustrated in FIG. 2.

FIG. 3 illustrates an AC equivalent circuit of the multi-port converter circuit shown in FIG. 2. The AC equivalent circuit shown in FIG. 3 includes a first equivalent alternating current (AC) power source 31, a second equivalent load resistance 32, and a third equivalent load resistance 33. The first equivalent AC power source 31 has a voltage component of $v_{FC1}(t)$. In FIG. 3, $R_{E2}$ represents the resistance value of the second equivalent load resistance 32, and $v_{FC2}(t)$ represents the voltage value applied to the second equivalent load resistance 32. Also, in FIG. 3, $R_{E3}$ represents the resistance value of the third equivalent load resistance 33, and $v_{FC3}(t)$ represents the voltage value applied to the third equivalent load resistance 33.

With the AC equivalent circuit shown in FIG. 3, the frequencies $f_S$ of the voltages $v_{FC1}(t)$, $v_{FC2}(t)$, and $v_{FC3}(t)$ are set to be substantially equal to the resonance frequency $f_R$ of the series resonant circuit 1. Under this frequency condition, as understood from the principle of the series resonance, the impedance of the series resonant circuit 1 becomes substantially zero and the voltage applied to the series resonant circuit 1 becomes substantially zero. Therefore, the following formulas (1) to (3) are satisfied:

$$v_{FC1}(t) + v_{FC2}(t) + v_{FC3}(t) = 0 \tag{1}$$

$$-v_{FC2}(t) = \frac{R_{E2}}{R_{E2}+R_{E3}} v_{FC1}(t) \tag{2}$$

$$-v_{FC3}(t) = \frac{R_{E3}}{R_{E2}+R_{E3}} v_{FC1}(t) \tag{3}$$

Figure 4:
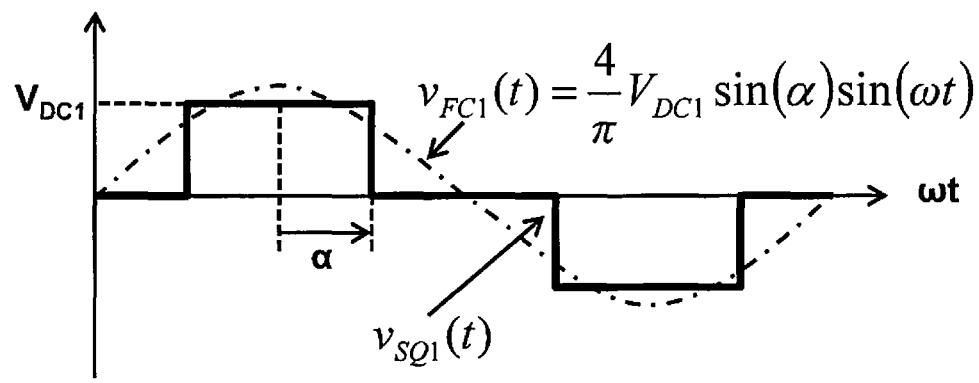
FIG. 4 illustrates voltage waveforms illustrating relationship between $v_{FC1}(t)$ and $v_{SQ1}(t)$.

FIG. 4 illustrates the voltage waveforms illustrating the relationship between $v_{FC1}(t)$ and $v_{SQ1}(t)$. In FIG. 4, $v_{FC1}(t)$ is illustrated with a dot-dash line, while $v_{SQ1}(t)$ is illustrated with a solid line. Here, $v_{SQ1}(t)$ represents the square wave generated by the first power source 4 and the first switching circuit 101. The square wave such as this can be generated by the phase shift control, as understood in the art. In the illustrated embodiment, $v_{SQ1}(t)$ is the square wave as illustrated in FIG. 4, where α represents the conduction angle of the first switching circuit 101. The fundamental component $v_{FC1}(t)$ of this square wave is expressed by the following formula (4):

$$v_{FC1}(t) = \frac{4}{\pi} V_{DC1} \sin(\alpha) \sin(\omega t) \tag{4}$$

Similarly, the fundamental component $v_{FC2}(t)$ of $v_{SQ2}(t)$ and the fundamental component $v_{FC3}(t)$ of $v_{SQ3}(t)$ are expressed by the following formulas (5) and (6) when taking the turns ratios of the second and third isolation transformers 21 and 22 into account, where β represents the conduction angle of $v_{SQ2}(t)$ and γ represents the conduction angle of $v_{SQ3}(t)$.

$$v_{FC2}(t) = -\left(\frac{n_{2P}}{n_{2S}}\right)\frac{4}{\pi} V_{DC2} \sin(\beta)\sin(\omega t) \tag{5}$$

$$v_{FC3}(t) = -\left(\frac{n_{3P}}{n_{3S}}\right)\frac{4}{\pi} V_{DC3} \sin(\gamma)\sin(\omega t) \tag{6}$$

Furthermore, the amplitudes of $v_{FC1}(t)$, $v_{FC2}(t)$, and $v_{FC3}(t)$ are expressed by the following formulas (7) to (9):

$$V_{FC1} = \frac{4}{\pi} V_{DC1} \sin(\alpha) \tag{7}$$

$$V_{FC2} = \left(\frac{n_{2P}}{n_{2S}}\right)\frac{4}{\pi} V_{DC2} \sin(\beta) \tag{8}$$

$$V_{FC3} = \left(\frac{n_{3P}}{n_{3S}}\right)\frac{4}{\pi} V_{DC3} \sin(\gamma) \tag{9}$$

Based on these formulas (7) to (9), the following formulas (10) and (11) are obtained as understood in the art:

$$V_{FC2} = \frac{R_{E2}}{R_{E2} + R_{E3}} V_{FC1} \tag{10}$$

$$V_{FC3} = \frac{R_{E3}}{R_{E2} + R_{E3}} V_{FC1} \tag{11}$$

Figure 5:
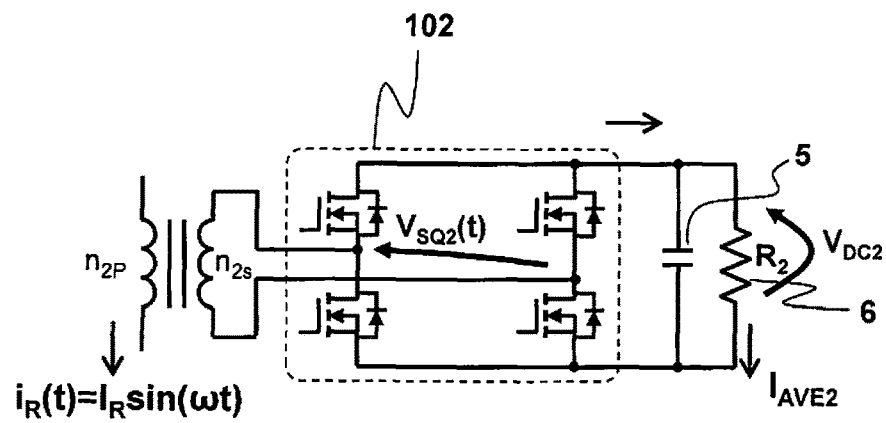
FIG. 5 is a circuit diagram illustrating a circuit structure of the second port illustrated in FIG. 2.
Figure 6:
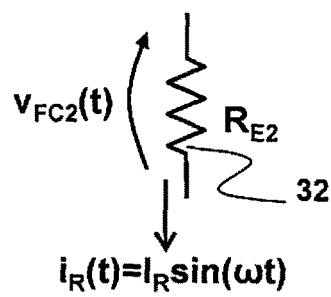
FIG. 6 is a circuit diagram illustrating an AC equivalent circuit of the circuit structure of the second port illustrated in FIG. 5.

Next, referring to FIGS. 5 to 8, the equivalent resistance of the second port 202 will be explained. FIG. 5 illustrates a circuit structure of the second port 202, while FIG. 6 illustrates the AC equivalent circuit thereof.

Figure 7:
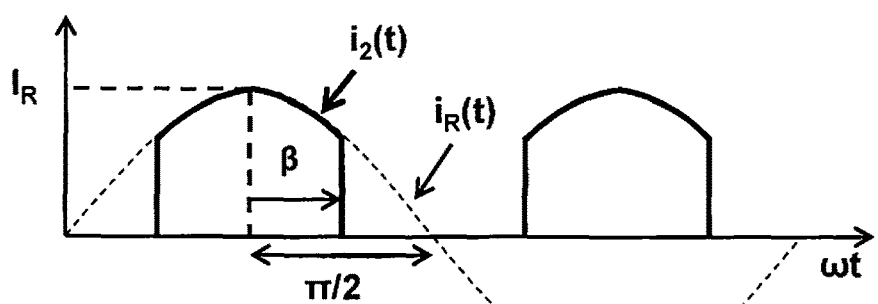
FIG. 7 is a waveform of $i_2(t)$.
Figure 8:
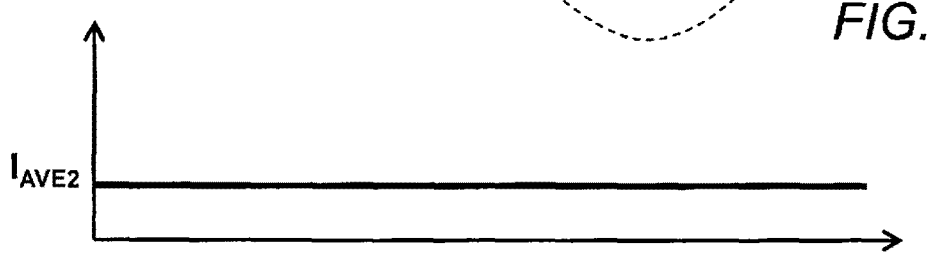
FIG. 8 is a graph of an average current $I_{AVE2}$ flowing through a second load resistance.

In FIG. 5, $i_2(t)$ represents the current flows from the second switching circuit 102 to the second smoothing capacitor 5 and the second load resistance 6. FIG. 7 illustrates the waveform of $i_2(t)$, while FIG. 8 illustrates the graph of the average current $I_{AVE2}$ flowing through the second load resistance 6. In FIG. 7, $i_2(t)$ is illustrated with a solid line, while $i_R(t)$ is illustrated with a dashed line. Hereinafter, for simplifying the explanation, the turns ratio of the second isolation transformer 21 is assumed to be 1. While the conduction angle of the second switching circuit 102 is β, $i_2(t)$ is equal to the current flowing through the series resonant circuit 1. Since the voltage $V_{DC2}$ applied to the second load resistance 6 is constant, the current $I_{AVE2}$ flowing through the second load resistance 6 is also constant. Therefore, the following formula (12) is satisfied, as understood in the art, since the average of $i_2(t)$ is equal to $I_{AVE2}$:

$$I_{AVE2} = \left(\frac{n_{2P}}{n_{2S}}\right)\frac{1}{\left(\frac{\pi}{2}\right)} I_R \int_{\frac{\pi}{2}}^{\frac{\pi}{2}+\varphi} \sin\theta d\theta = \left(\frac{n_{2P}}{n_{2S}}\right)\frac{2}{\pi} I_R \sin\beta \tag{12}$$

Also, the current amplitude $I_R$ is expressed by the following formula (13), as understood in the art:

$$I_R = \left(\frac{n_{2S}}{n_{2P}}\right)\frac{\pi}{2} \frac{1}{\sin\beta} I_{AVE2} \tag{13}$$

Thus, the equivalent resistance $R_{E2}$ is calculated based on the formulas (8) and (12) as shown in the following formula (14):

$$R_{E2} = \frac{V_{FC2}}{I_R} \tag{14}$$

$$= \left(\frac{n_{2P}}{n_{2S}}\right)^2 \frac{8}{\pi^2} (\sin\beta)^2 \frac{V_{DC2}}{I_{AVE2}}$$

$$= \left(\frac{n_{2P}}{n_{2S}}\right)^2 \frac{8}{\pi^2} (\sin\beta)^2 R_2$$

Similarly, as understood in the art, the equivalent resistance $R_{E3}$ of the third port 203 is also calculated as shown in the following formula (15):

$$R_{E3} = \left(\frac{n_{3P}}{n_{S3}}\right)^2 \frac{8}{\pi^2} (\sin\gamma)^2 R_3 \tag{15}$$

The conduction angles β and γ are calculated as a function of α as shown in the following formulas (16) and (17), respectively, by substituting the formulas (7) to (9), (14) and (15) for the formulas (10) and (11):

$$\sin\beta = \frac{R_3 V_{DC2} V_{DC1}}{V_{DC3}^2 R_2 + V_{DC2}^2 R_3} \frac{n_{2S}}{n_{2P}} \sin\alpha \tag{16}$$

$$\sin\gamma = \frac{R_2 V_{DC3} V_{DC1}}{V_{DC3}^2 R_2 + V_{DC2}^2 R_3} \frac{n_{3S}}{n_{3P}} \sin\alpha \tag{17}$$

The current amplitude $I_R$ is calculated by the following formula (18):

$$I_R = \frac{V_{R1}}{R_{E2} + R_{E3}} \tag{18}$$

The Quality factor (Q factor) of the resonance circuit is calculated by the following formula (19):

$$Q = \frac{2\pi \cdot f_S L_R}{R_{E2} + R_{E3}} = \frac{1}{(R_{E2} + R_{E3}) \cdot 2\pi \cdot f_S C_R} \quad (19)$$

Generally, as long as the Q factor is high, the AC approximation is satisfied.

As understood from the formulas (16) and (17), $\sin(\beta)$ and $\sin(\gamma)$ is proportional to $\sin(\alpha)$. Thus, if $\alpha$ is set to a value, then $\beta$ and $\gamma$ can be calculated based on the circuit parameters.

TABLE 1

| | | | | | |
|---|---|---|---|---|---|
| $V_{DC1}$ [V] | 40 | $R_2$ [Ω] | 20 | $n_{2P}$ [Turns] | 1 | $f_S$ [Hz] | 100,000 |
| $V_{DC2}$ [V] | 40 | $R_3$ [Ω] | 5 | $n_{2S}$ [Turns] | 1 | $C_R$ [F] | 5.00E−08 |
| $V_{DC3}$ [V] | 10 | | | $n_{3P}$ [Turns] | 1 | $L_R$ [H] | 5.07E−05 |
| | | | | $n_{3S}$ [Turns] | 1 | | |

Table 1 above illustrates an example of the circuit parameters.

Figure 9:
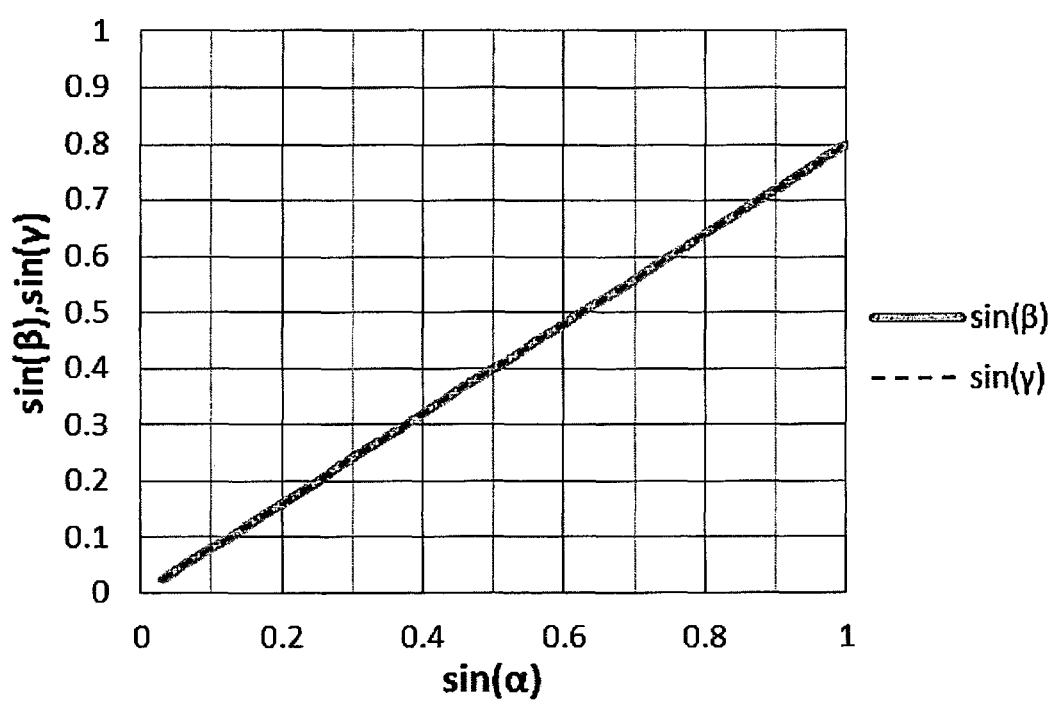
FIG. 9 illustrates graphs expressing $\sin(\beta)$ and $\sin(\gamma)$ as functions of $\sin(\alpha)$.

FIG. 9 illustrates the graphs expressing $\sin(\beta)$ and $\sin(\gamma)$ as functions of $\sin(\alpha)$. In FIG. 9, the relationship between $\sin(\alpha)$ and $\sin(\beta)$ is illustrated with a gray solid line, while the relationship between $\sin(\alpha)$ and $\sin(\gamma)$ is illustrated with a black dashed line. In other words, as understood in the art, as long as $\sin(\beta)$, $\sin(\gamma)$, and $\sin(\alpha)$ satisfy the relationships shown in FIG. 9, the values of $V_{DC2}$, $V_{DC3}$ are obtained as shown in Table 1.

Figure 10:
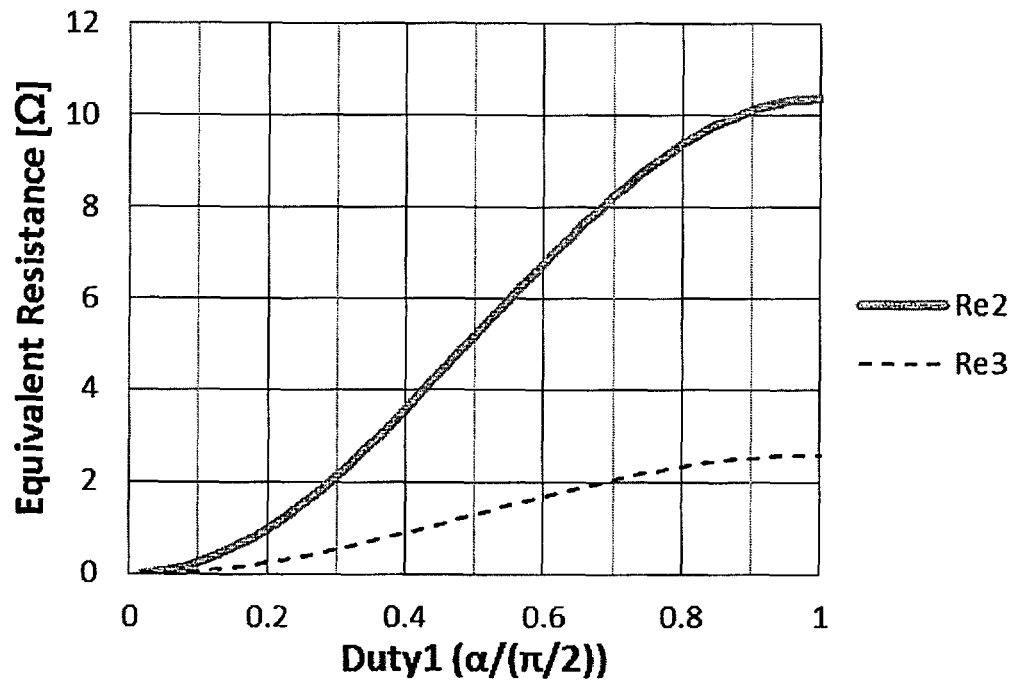
FIG. 10 illustrates graphs illustrating relationships between a duty ratio of a first port and equivalent resistances $R_{E2}$ and $R_{E3}$.
Figure 11:
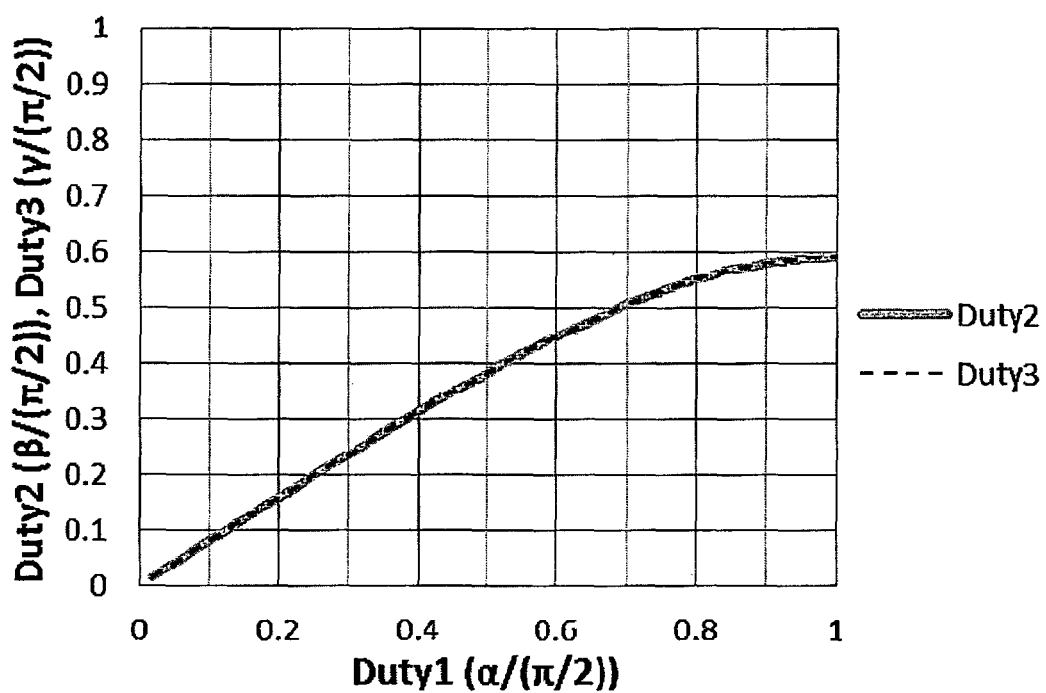
FIG. 11 illustrates graphs illustrating relationships between the duty ratio of the first port and duty ratios of the second and third ports.
Figure 12:
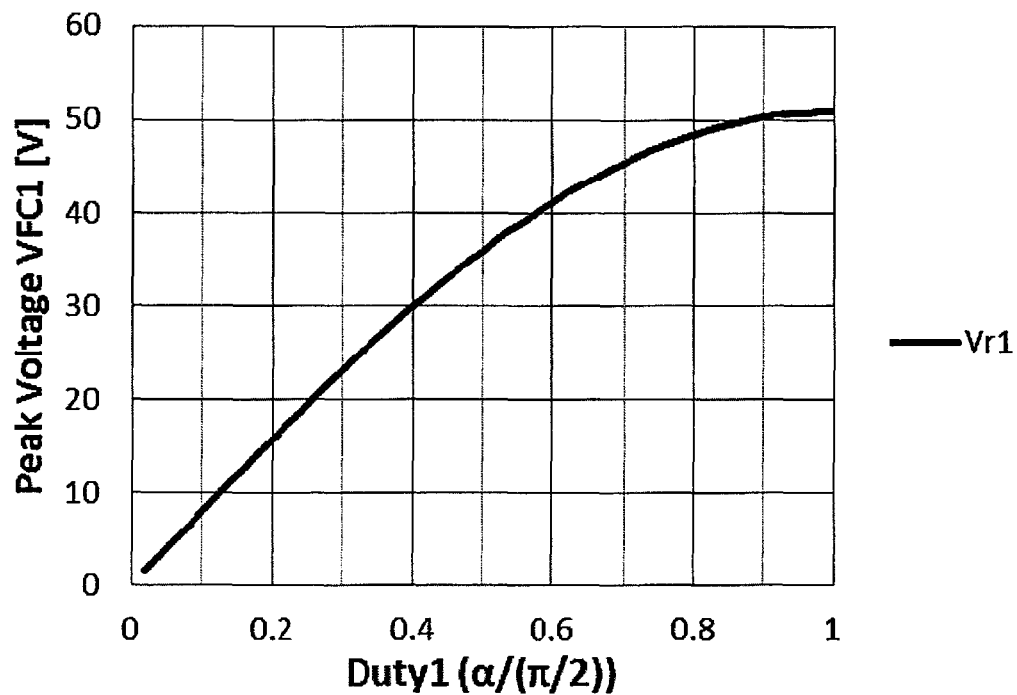
FIG. 12 illustrates a graph illustrating relationship between the duty ratio of the first port and a peak voltage of the voltage $v_{FC1}(t)$.
Figure 13:
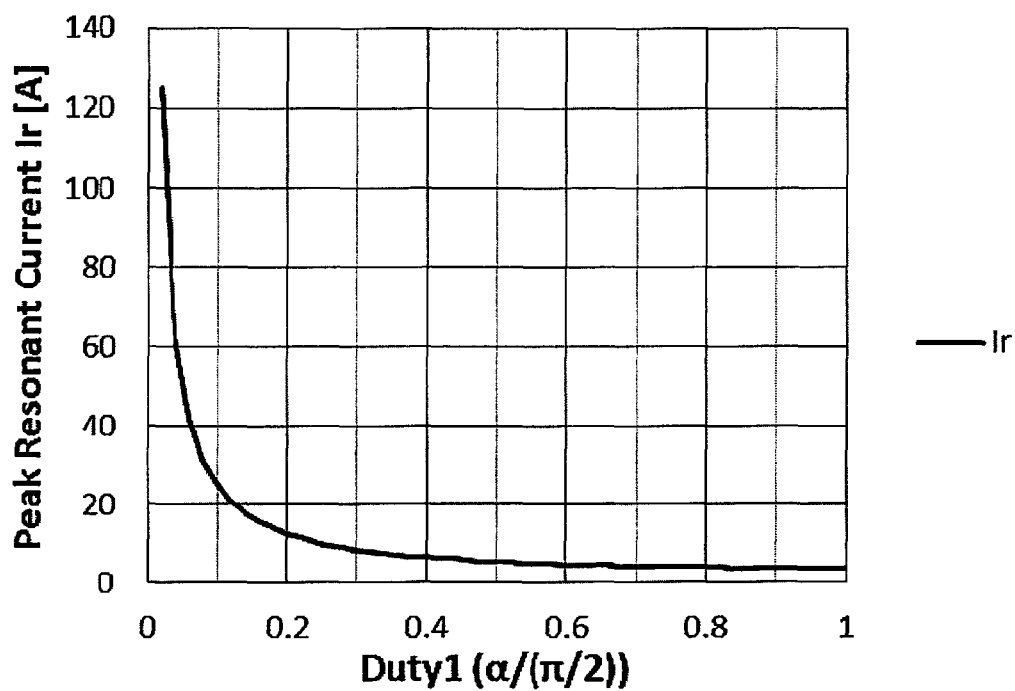
FIG. 13 illustrates a graph illustrating relationship between the duty ratio of the first port and a peak resonant current of the current $I_R$.
Figure 14:
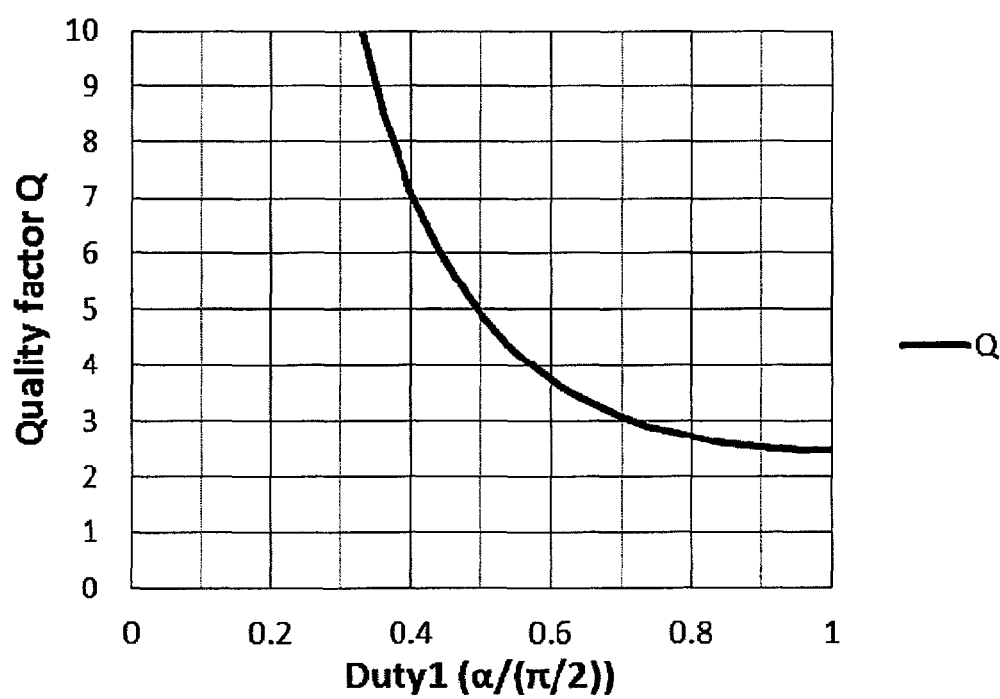
FIG. 14 illustrates a graph illustrating relationship between the duty ratio of the first port and a Q factor.

FIGS. 10 to 14 illustrate graphs expressing the parameters as functions of the duty ratio of the first port 201, respectively. FIG. 10 illustrates a graph illustrating the relationships between the duty ratio of the first port 201 (Duty1) and the equivalent resistances $R_{E2}$ and $R_{E3}$. In FIG. 10, the relationship between Duty1 and the equivalent resistance $R_{E2}$ is illustrated with a gray solid line, while the relationship between Duty1 and the equivalent resistance $R_{E3}$ is illustrated with a black dashed line. FIG. 11 illustrates graphs illustrating the relationships between the duty ratio of the first port 201 (Duty1) and the duty ratios of the second and third ports 202 and 203 (Duty2 and Duty3). In FIG. 11, the relationship between Duty1 and Duty2 is illustrated with a gray solid line, while the relationship between Duty1 and Duty3 is illustrated with a black dashed line. FIG. 12 illustrates a graph illustrating the relationship between the duty ratio of the first port 201 (Duty1) and the peak voltage of the voltage $v_{FC1}(t)$. FIG. 13 illustrates a graph illustrating the relationship between the duty ratio of the first port 201 (Duty1) and the peak resonant current of the current $I_R$. FIG. 14 illustrates a graph illustrating the relationship between the duty ratio of the first port 201 (Duty1) and the Q factor.

The duty ratios of the first, second and third ports 201, 202 and 203 correspond to the conduction angles, respectively, as shown in the following formulas (20) to (22), as understood in the art:

$$\text{Duty1} = \frac{\alpha}{\pi/2} \quad (20)$$

$$\text{Duty2} = \frac{\beta}{\pi/2} \quad (21)$$

$$\text{Duty3} = \frac{\gamma}{\pi/2} \quad (22)$$

As shown in FIG. 13, the amplitude of the resonant current $I_R$ decreases as Duty1 increases. The lower the amplitude of the resonant current $I_R$ becomes, the lower the conduction loss of the transformer wirings or the semiconductor device become. Thus, from the point of view of the conduction loss, it is preferable for Duty1 to be high. On the other hand, the Q factor decreases as Duty1 becomes higher.

With this power convertor 100, the Q factor can be kept equal to or more than 1 by setting the impedance at the switching frequency of the series resonant circuit 1 to be higher than the total effective load resistance value, thereby the AC approximation used in the above-mentioned analysis being satisfied. As a result, the output voltages are obtained as desired.

With the power convertor 100, the controller 110 controls the first, second and third switching circuits 101, 102 and 103, respectively, to obtain the desired output voltages. In particular, in the illustrated embodiment, the calculation unit 112 of the controller 110 calculates the resistance values $R_2$ and $R_3$ (e.g., the load resistance values) of the second and third load resistances 6 and 8 based on the applied voltages $V_{DC2}$ and $V_{DC3}$ to the second and third load resistances 6 and 8 and the average currents $I_{AVE2}$ and $I_{AVE3}$ to the second and third load resistances 6 and 8, respectively, as understood in the art. More specifically, the calculation unit 112 calculates the resistance value $R_2$ by dividing the applied voltage $V_{DC2}$ by the average current $I_{AVE2}$, and calculates the resistance value $R_3$ by dividing the applied voltage $V_{DC3}$ by the average current $I_{AVE3}$. Here, the applied voltages $V_{DC2}$ and $V_{DC3}$ are detected by voltage sensors (not shown) that are configured and arranged to detect the applied voltages to the second and third load resistances 6 and 8, respectively, while the average currents $I_{AVE2}$ and $I_{AVE3}$ are detected by current sensors (not shown) that are configured and arranged to detect the average currents flowing through the second and third load resistances 6 and 8, respectively.

Then, the control unit 114 of the controller 110 determines the duty ratios of the first, second and third switching circuits 101, 102 and 103 based on the load resistance values $R_2$ and $R_3$, the target power source voltage value $V_{DC1}$ and the target voltage values $V_{DC2}$ and $V_{DC3}$ to the second and third load resistances 6 and 8, as understood in the art. In the illustrated embodiment, the target power source voltage value $V_{DC1}$ and the target voltage values $V_{DC2}$ and $V_{DC3}$ are preset or pre-stored to the control unit 114 of the controller 110, while the load resistance values $R_2$ and $R_3$ are calculated by the calculation unit 112 of the controller 110. More specifically, in the illustrated embodiment, as shown in Table 1 above, the target power source voltage value $V_{DC1}$ and the target voltage values $V_{DC2}$ and $V_{DC3}$ are preset to 40[V], 40[V], and 10[V], respectively.

As understood in the art, the formula (19) can be transformed to express the relationship between the Q factor and the conduction angle $\alpha$ using the formulas (14) to (17). In particular, by substituting the target power source voltage value $V_{DC1}$, the target voltage values $V_{DC2}$ and $V_{DC3}$, and the load resistance values $R_2$ and $R_3$ for the formulas (16) and (17), the relation between $\sin(\alpha)$ and $\sin(\beta)$ and the relation between $\sin(\alpha)$ and $\sin(\gamma)$ can be obtained. In other words, using the formulas (16) and (17), $\sin(\beta)$ and $\sin(\gamma)$ can be expressed as functions of $\sin(\alpha)$, respectively. Furthermore, as understood in the art, by substituting $\sin(\beta)$ and $\sin(\gamma)$ that have been obtained as functions of $\sin(\alpha)$ and the load resistance values $R_2$ and $R_3$ that have been calculated by the calculation unit 112 for the formulas (14) and (15), the effective load resistance values $R_{E2}$ and $R_{E3}$ can be calculated as functions of $\sin(\alpha)$. Then, by substituting the effective load resistance values $R_{E2}$ and $R_{E3}$ that have been calculated and the circuit parameters fs and $C_R$ that have been preset or pre-stored for the formula (19), the relation between the Q factor and the conduction angle α can be obtained. In the illustrated embodiment, as shown in Table 1 above, the circuit parameters fs and $C_R$ are preset to 100,000 [Hz] and 5.00E-08[F], respectively.

As mentioned above, it is preferable for the Q factor to be kept enough high. For example, to well satisfy the AC approximation used in the above-mentioned analysis, the characteristic impedance is set to be higher than the total effective load resistance value, and in this case, the Q factor need to be equal to or more than 1. In other words, in the illustrated embodiment, the Q factor is set to be equal to or more than 1. In the illustrated embodiment, the Q factor is set to 4.134, for example, as described below. Once the Q factor is determined, the conduction angle α can be obtained from the above-mentioned relation between the Q factor and the conduction angle α, as understood in the art. Also, once the conduction angle α is obtained, the conduction angles β and γ can be obtained from the above-mentioned relations between sin(α) and sin(β) and between sin(α) and sin(γ) using the formulas (16) and (17), for example.

Then, the control unit 114 of the controller 110 determines the duty ratios Duty1, Duty2 and Duty3 of the first, second and third switching circuits 101, 102 and 103 based on the calculation results of the conduction angles α, β and γ. In particular, the control unit 114 calculates the duty ratios Duty1, Duty2 and Duty3 according to the formulas (20), (21) and (22), respectively. Then, the control unit 116 controls the switching elements of the first, second and third switching circuits 101, 102 and 103, respectively, using the phase shifted PWM, such that the duty ratios Duty1, Duty2 and Duty3 can be obtained at the first, second and third ports 201, 202 and 203, respectively. The phase shifted PWM for the switching elements are well known in the art. Thus, the detailed descriptions will be omitted for the sake of brevity.

In the illustrated embodiment, the calculations performed by the calculation unit 112 and the control unit 114 of the controller 110 are described step-by-step. However, of course, the plurality steps of calculations can be performed as a single step of calculation. For example, in the illustrated embodiment, the duty ratios Duty1, Duty2 and Duty3 are ultimately obtained as functions of the applied voltages $V_{DC2}$ and $V_{DC3}$ detected by the voltage sensors and the average currents $I_{AVE2}$ and $I_{AVE3}$ detected by the current sensors when the target voltage values $V_{DC1}$, $V_{DC2}$ and $V_{DC3}$, the target value of the Q factor, and the circuit parameters, such as $n_{2P}$, $n_{2S}$, $n_{3P}$, $n_{3S}$, fs and $C_R$, are given. Thus, the controller 110 can also calculate the duty ratios Duty1, Duty2 and Duty 3 in response to obtaining the applied voltages $V_{DC2}$ and $V_{DC3}$ from the voltage sensors and the average currents $I_{AVE2}$ and $I_{AVE3}$ from the current sensors. Also, the above-mentioned calculations explained as using the preset target values, such as the target voltage values $V_{DC1}$, $V_{DC2}$ and $V_{DC3}$, and the target value of the Q factor can be performed by using the values detected by sensors or the values calculated in a manner well known in the art, as needed and/or desired. Similarly, the above-mentioned calculations explained as using the values detected by sensors can be performed by using the preset target values, as needed and/or desired.

Next, the simulation results of the above-mentioned operations of the power converter 100 will be explained.

Figure 15:
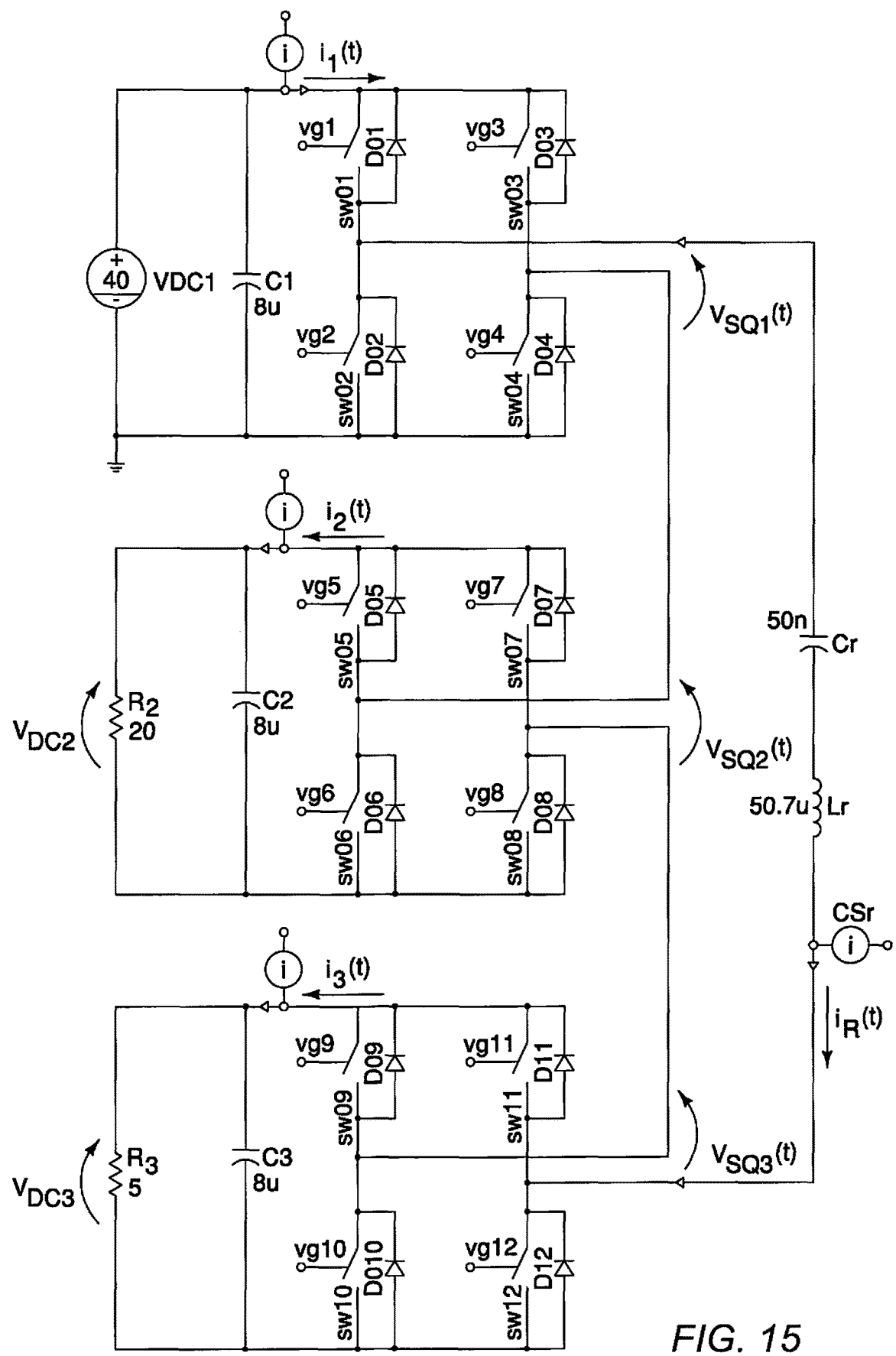
FIG. 15 illustrates a circuit diagram used in the simulation.

FIG. 15 illustrates the circuit diagram used in the simulation. The circuit diagram shown in FIG. 15 basically has an identical topology as the circuit diagram shown in FIG. 1 in regards to the main components. Additional components or terminals in FIG. 15 are shown for the purposes of simulation. However, as understood in the art, the circuits shown by the circuit diagrams shown in FIGS. 1 and 15 are basically identically operated. Specifically, switches sw01 to sw04 and diodes D01 to D04 shown in FIG. 15 correspond to the switching elements of the first switching circuit 101 shown in FIG. 1, switches sw05 to sw08 and diodes D05 to D08 shown in FIG. 15 correspond to the switching elements of the second switching circuit 102, and switches sw09 to sw12 and diodes D09 to D12 shown in FIG. 15 correspond to the switching elements of the third switching circuit 103.

With this simulation, the circuit parameters shown in Table 1 are also used. Furthermore, with this simulation, the duty ratios and the Q factor shown in Table 2 below are used.

TABLE 2

| Duty1 | 0.560 |
|---|---|
| Duty2 | 0.423 |
| Duty3 | 0.423 |
| Q | 4.134 |

Figure 16:
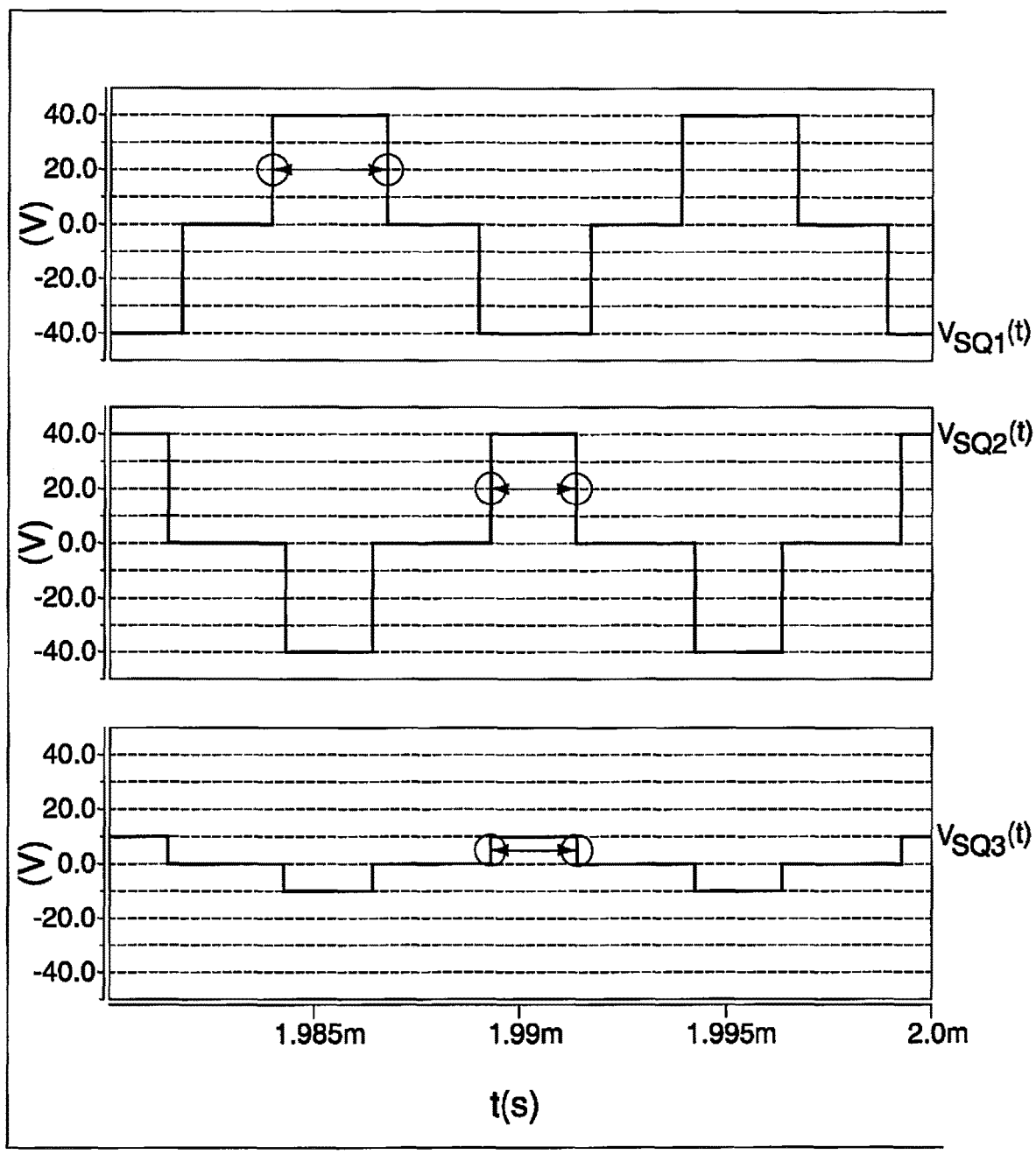
FIG. 16 illustrates waveforms of $v_{SQ1}(t)$, $v_{SQ2}(t)$, and $v_{SQ3}(t)$.

FIG. 16 illustrates the waveforms of $v_{SQ1}(t)$, $v_{SQ2}(t)$, and $v_{SQ3}(t)$. The waveforms of $v_{SQ1}(t)$, $v_{SQ2}(t)$, and $v_{SQ3}(t)$ has the peak voltages $V_{DC1}$, $V_{DC2}$, and $V_{DC3}$, respectively, and has the duty ratios shown in Table 2.

Figure 17:
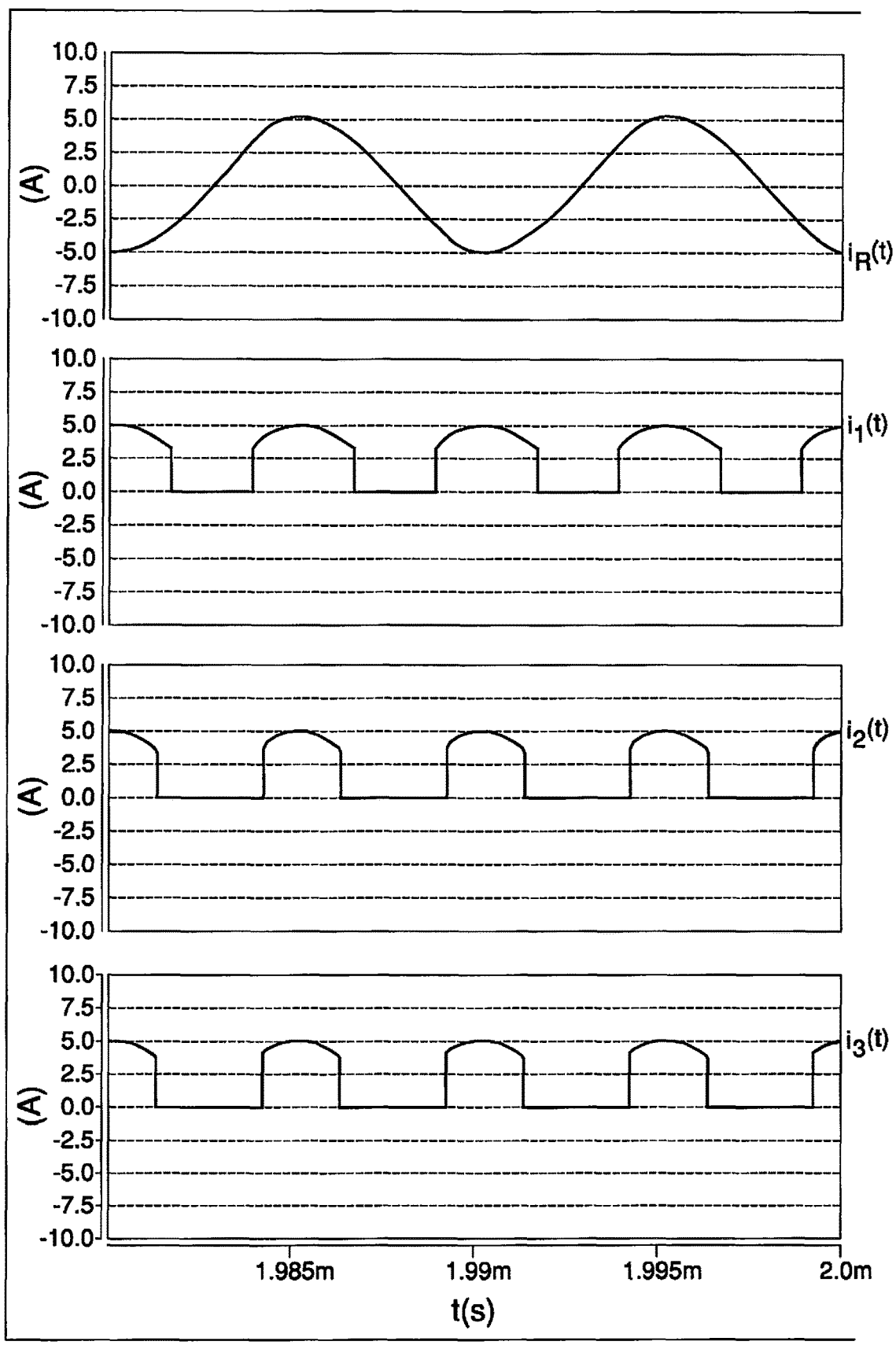
FIG. 17 illustrates waveforms of $i_R(t)$, $i_1(t)$, $i_2(t)$, and $i_3(t)$.

FIG. 17 illustrates the waveforms of $i_R(t)$, $i_1(t)$, $i_2(t)$, and $i_3(t)$. With this simulation, since the Q factor is set to be a high value of 4.134 as shown in Table 2, $i_R(t)$ is a sin wave.

Figure 18:
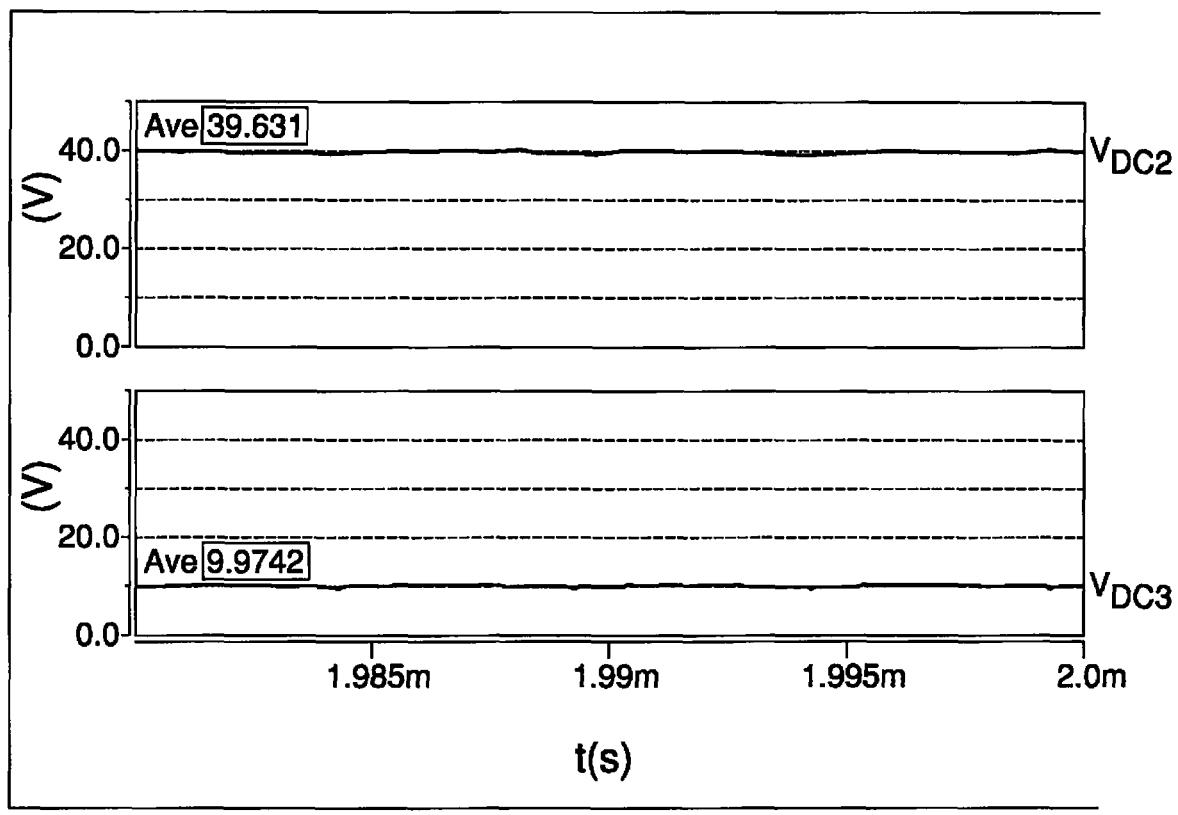
FIG. 18 illustrates waveforms of output voltages $V_{DC2}$ and $V_{DC3}$ of the second and third ports, respectively.

FIG. 18 illustrates the waveforms of the output voltages $V_{DC2}$ and $V_{DC3}$ of the second and third ports 202 and 203, respectively. The average output voltage values are 39.6V and 9.97V, respectively, which are substantially equal to the target voltages 40V and 10V shown in Table 1, respectively. Thus, with this power convertor 100, the desired output voltages at the second and third ports 202 and 203 can be obtained.

In the illustrated embodiment, the power converter 100 includes the first, second and third switching circuits 101, 102 and 103 (e.g., at least three switching circuits), the first power source 4 (e.g., at least one power source), the second and third load resistances 6 and 8 (e.g., at least one load), and the series resonant circuit 1 (e.g., a resonant circuit). The input terminals of the first, second and third switching circuits 101, 102 and 103 are connected to either the first power source 4 (e.g., the at least one power source) or the second and third load resistances 6 and 8 (e.g., the at least one load). The output terminals 301, 302 and 303 of the first, second and third switching circuits 101, 102 and 103 are electrically serially connected to the series resonant circuit 1 to form a closed circuit.

With this power converter 100, the power between a plurality of ports 201, 202 and 203 can be controlled as desired. Thus, it is possible to provide a power converter with which the number of parts can be reduced and the size and the cost thereof can be reduced.

In the illustrated embodiment, with the power converter 100, the sum of the fundamental component of voltage waveform $v_{FC1}(t)$ generated by the first switching circuit (e.g., a set of the switching circuits) that is connected to the first power source 4 (e.g., the at least one power source) is substantially equal to the sum of the fundamental components of voltage waveforms $V_{FC2}(t)$, and $v_{FC3}(t)$ applied to the second and third switching circuits 102 and 103 (e.g., a set of the switching circuits) that are connected to the second and third load resistances 6 and 8 (e.g., the at least one load).

With this power converter 100, the power between a plurality of ports 201, 202 and 203 can be controlled as desired by making the sum of the fundamental component of the at least one power source selectively filtered by the series resonant circuit 1 to be equal to the sum of fundamental component of the at least one load.

In the illustrated embodiment, with the power converter 100, the frequencies $f_S$ of the voltage waveforms $v_{FC1}(t)$, $V_{FC2}(t)$, and $v_{FC3}(t)$ are substantially equal to the resonant frequency $f_R$ of the series resonant circuit 1.

With this power converter 100, the fundamental component can be selectively obtained by making the frequencies $f_S$ of the voltage waveforms $v_{FC1}(t)$, $V_{FC2}(t)$, and $v_{FC3}(t)$ to be near the resonant frequency $f_R$ of the series resonant circuit 1.

In the illustrated embodiment, with the power converter 100, the phases of the voltage waveforms $v_{SQ1}(t)$, $v_{SQ2}(t)$, and $v_{SQ3}(t)$ are substantially equal to each other.

With this power converter 100, the sum of the fundamental component $v_{FC1}(t)$ of the first power source (e.g., the at least one power source) and the sum of the fundamental components $V_{FC2}(t)$, and $v_{FC3}(t)$ of the second and third load resistances 6 and 8 (e.g., the at least one load) can be made equal to each other by making the voltage waveforms $v_{SQ1}(t)$, $v_{SQ2}(t)$, and $v_{SQ3}(t)$ to be the same phase.

In the illustrated embodiment, with the power converter 100, the output terminals of the second and third switching circuits 102 and 103 are serially connected to the closed circuit via the second and third isolation transformers 21 and 22.

With this power converter 100, a desired output terminal can be electrically isolated from the other output terminal by connecting the desired output terminal via the isolation transformer.

In the illustrated embodiment, with the power converter 100, the characteristic impedance of the resonant circuit is higher than the total effective load resistance value serially connected to the closed circuit.

With the power converter according to the sixth aspect, the fundamental component of the voltage waveform can be effectively filtered by the resonant circuit by making the characteristic impedance of the series resonant circuit 1 to be higher than the total effective load resistance value $R_{E2}$ and $R_{E3}$.

In the illustrated embodiment, with the power converter 100, the first, second and third switching circuits 101, 102 and 103 (e.g., at least one of the switching circuits) include a full bridge circuit.

In the illustrated embodiment, the power converter 100 includes the calculation unit 112 configured to calculate the load resistance values $R_2$ and $R_3$ based on the applied voltages $V_{DC2}$ and $V_{DC3}$ to the second and third load resistances 6 and 8 (e.g., the at least one load) and the average currents $I_{AVE2}$ and $I_{AVE3}$ to the second and third load resistances 6 and 8 (e.g., the at least one load), and the control unit 114 configured to determine the duty ratios Duty1, Duty2 and Duty3 of the first, second and third switching circuits 101, 102 and 103 based on the load resistance values $R_2$ and $R_3$ (e.g., the load resistance value), the target power source voltage value $V_{DC1}$ (e.g., the power source voltage value) and the target voltage values $V_{DC2}$ and $V_{DC3}$ (e.g., the target voltage values) to the second and third load resistances 6 and 8 (e.g., the at least one load).

With this power converter 100, the power between a plurality of ports 201, 202 and 203 can be controlled as desired.

Second Embodiment

Figure 19:
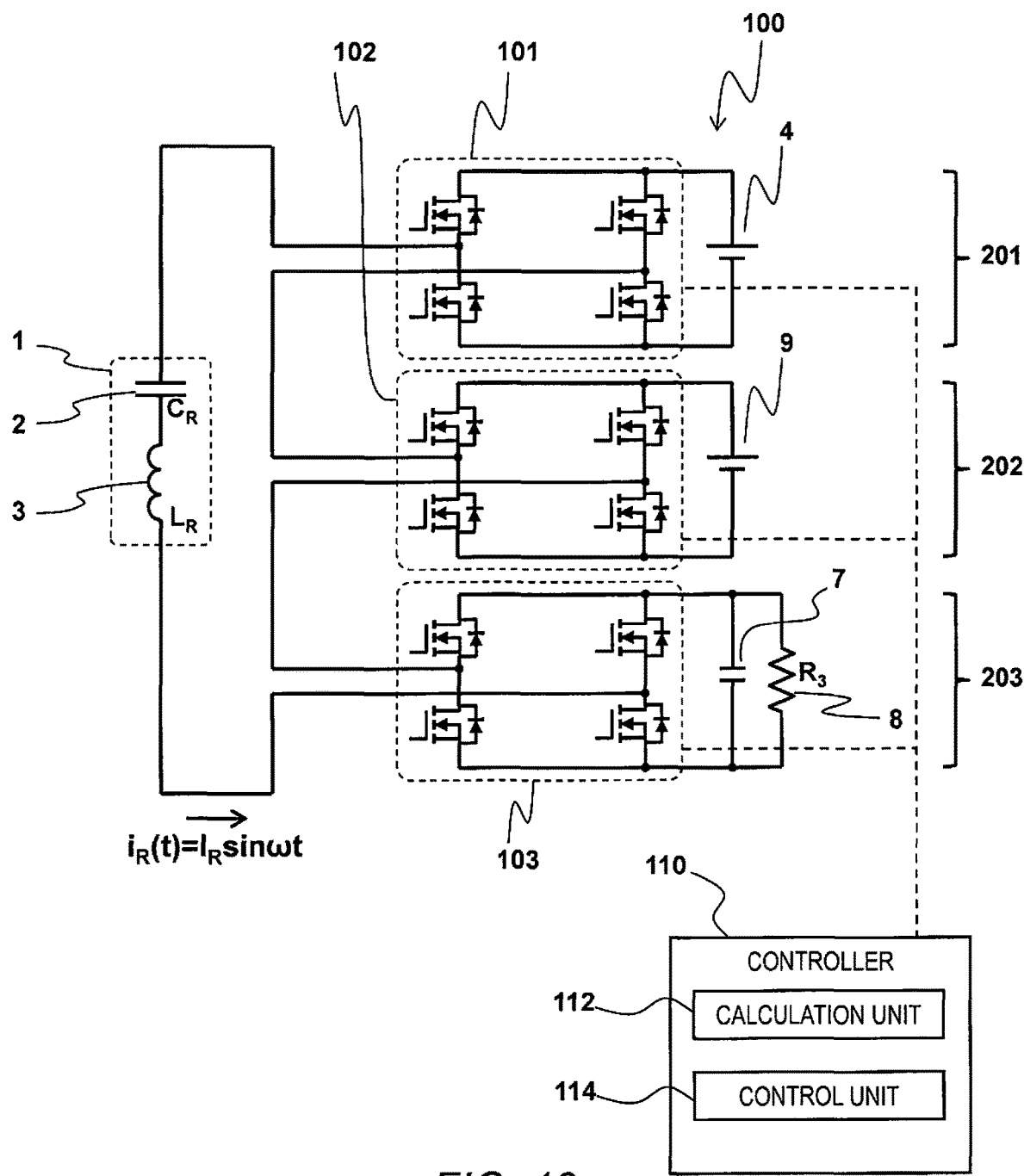
FIG. 19 is a circuit diagram illustrating a circuit structure of a power convertor in accordance with a second embodiment.

FIG. 19 is a circuit diagram illustrating a circuit structure of a power convertor 100 in accordance with the second embodiment. The power convertor 100 illustrated in FIG. 19 is basically identical to the power convertor 100 illustrated in FIG. 1, except that a second power source 9 is connected to the second port 202 instead of the second load resistance 6 illustrated in FIG. 1.

More specifically, with the power convertor 100 in accordance with the first embodiment, two loads are connected to a single power source. On the other hand, with the power convertor 100 in accordance with the second embodiment, a single load is connected to two power sources. In other words, the power convertor 100 forms a DC-DC convertor with the first and second power sources 4 and 9 as multiple (a pair of) inputs and the third load resistance 8 as a single output.

With this power convertor 100 in accordance with the second embodiment, as shown in FIG. 19, even if two power sources are provided, the power convertor 100 can be operated in the similar manner as explained in the first embodiment, as understood in the art.

Third Embodiment

Figure 20:
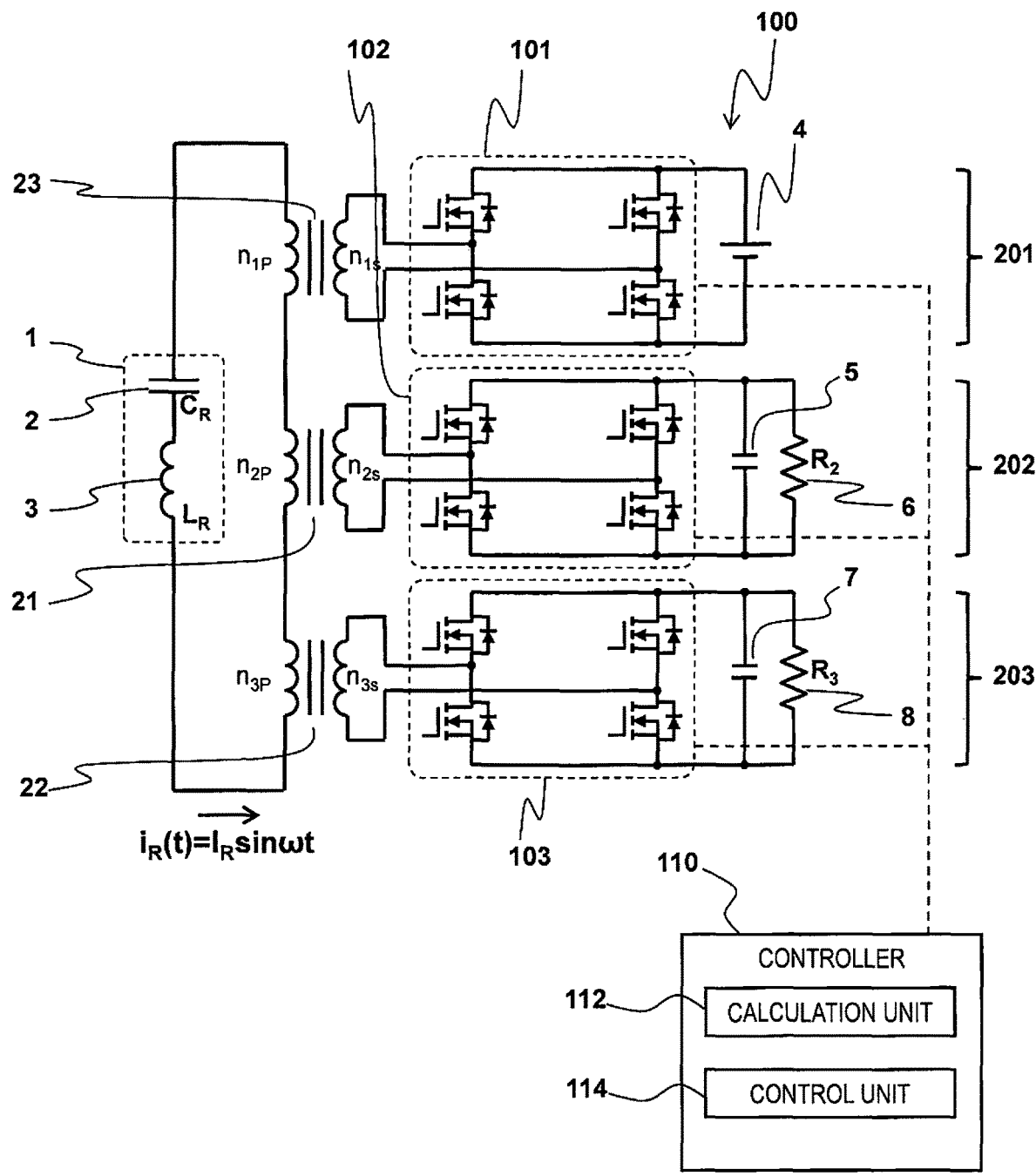
FIG. 20 is a circuit diagram illustrating a circuit structure of a power convertor in accordance with a third embodiment.

FIG. 20 is a circuit diagram illustrating a circuit structure of a power convertor 100 in accordance with the third embodiment. The power convertor 100 illustrated in FIG. 20 is basically identical to the power convertor 100 illustrated in FIG. 2, except that a first isolation transformer 23 is inserted at a location where the first port 201 is connected to the series resonant circuit 1.

More specifically, as shown in FIG. 20, the numbers of turns of the first isolation transformer 23 are $n_{1P}$ and $n_{1S}$, and the first port 201 is electrically isolated from the closed circuit. With this configuration, each of the first, second and third ports 201, 202 and 203 can be isolated from the series resonant circuit 1, as understood in the art. Also, the power convertor 100 can be operated in the similar manner as explained in the first embodiment, as understood in the art, by taking the numbers of turns of the first isolation transformer 23 into account.

Fourth Embodiment

Figure 21:
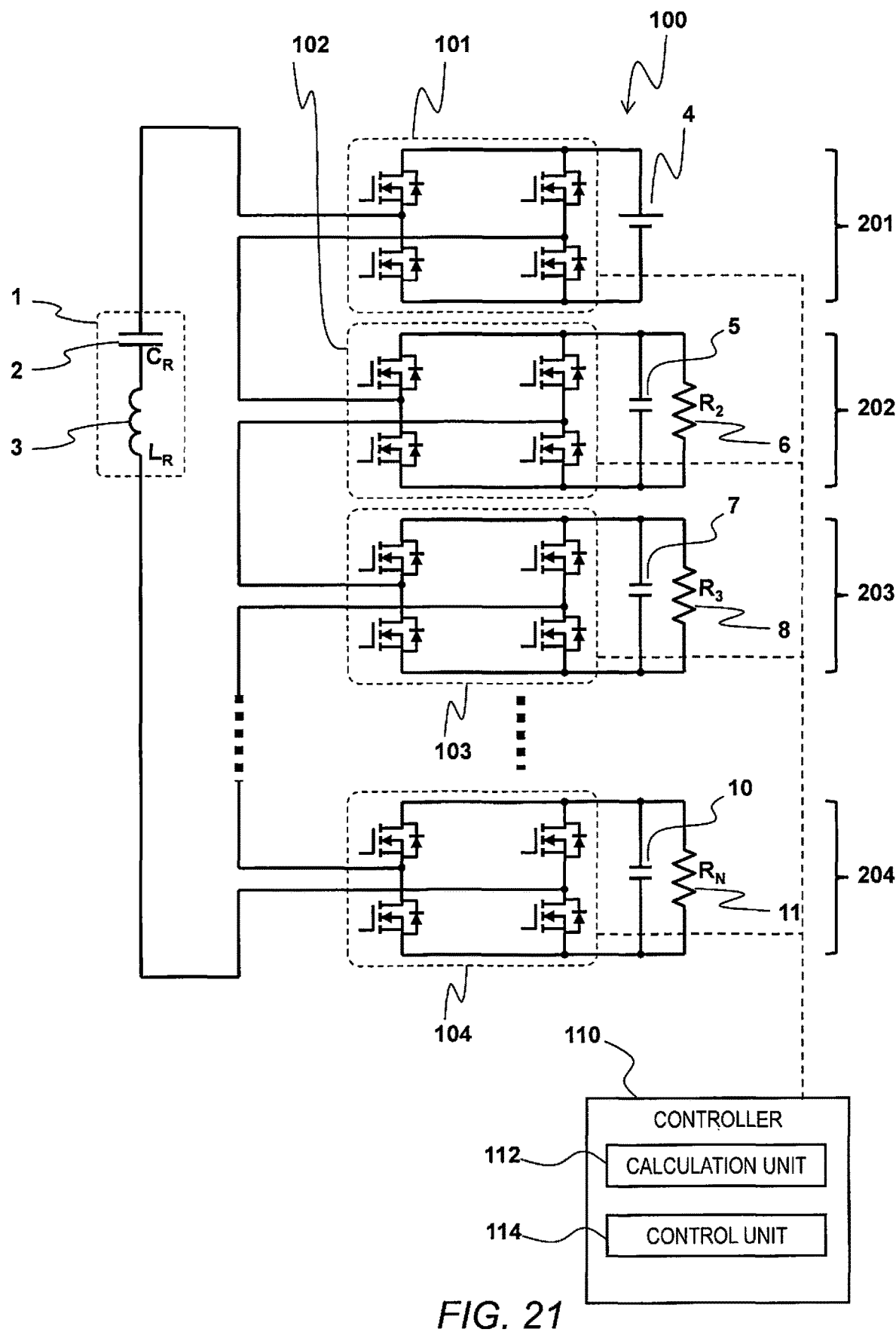
FIG. 21 is a circuit diagram illustrating a circuit structure of a power convertor in accordance with a fourth embodiment.

FIG. 21 is a circuit diagram illustrating a circuit structure of a power convertor 100 in accordance with the fourth embodiment. The power convertor 100 illustrated in FIG. 21 is basically identical to the power convertor 100 illustrated in FIG. 1, except that more than three ports (N ports: N is more than three) 201, 202, 203, . . . , and 204 are provided to the power convertor 100.

Specifically, in the illustrated embodiment, an N-th port 204 includes an N-th switching circuit 104, an N-th smoothing capacitor 10 and an N-th load resistance 11 with the load resistance value $R_N$. In other words, in the illustrated embodiment, the power convertor 100 forms a DC-DC convertor with the first power source 4 as a single input and the second, third, . . . , and N-th load resistances 6, 8, . . . , and 11 as multiple (N−1) outputs.

As shown in FIG. 21, even if the number of ports is more than three ports that are illustrated in FIG. 1, the power convertor 100 illustrated in FIG. 21 can be operated in the similar manner as explained in the first embodiment, as understood in the art.

In the illustrated embodiment, the multiple ports 201, 202, 203, . . . , and 204 of the power converter 100 has a single power source 4. However, of course, the multiple ports 201, 202, 203, . . . , and 204 can includes a plurality of power sources, as needed and/or desired.

Fifth Embodiment

Figure 22:
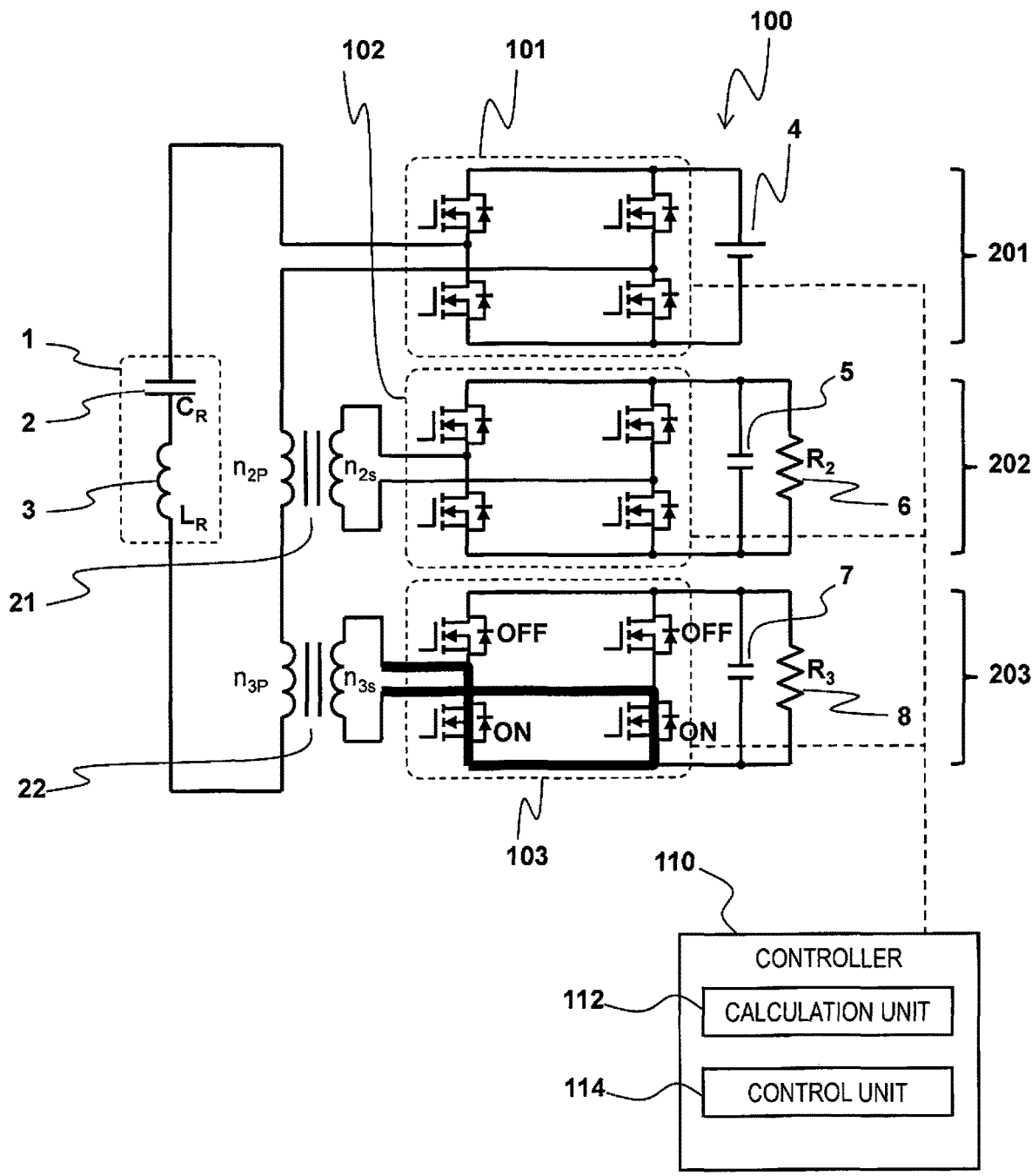
FIG. 22 is a circuit diagram illustrating a circuit structure of a power convertor in accordance with a fifth embodiment.

FIG. 22 is a circuit diagram illustrating a circuit structure of a power convertor 100 in accordance with the fifth embodiment. The power convertor 100 illustrated in FIG. 22 is basically identical to the power convertor 100 illustrated in FIG. 2. With the power convertor 100 illustrated in FIG. 22, the third port 203 is idled by making the power exchange at the third port 203 to be zero.

Figure 23:
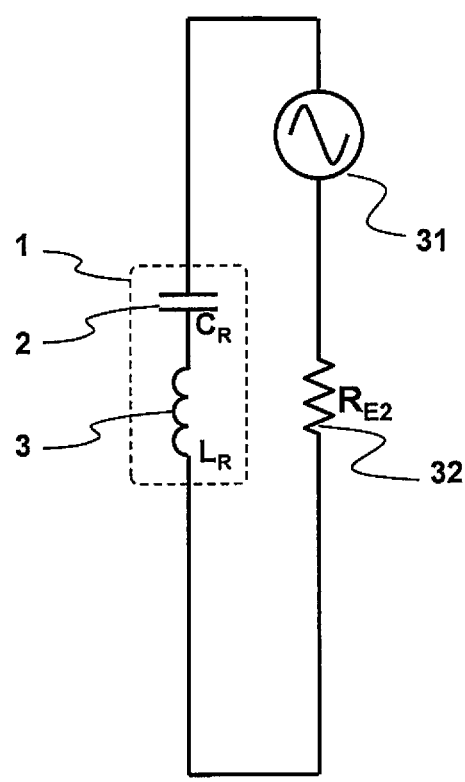
FIG. 23 is a circuit diagram illustrating an AC equivalent circuit of the circuit structure illustrated in FIG. 22.

With the conventional converter such as illustrated in Non-Patent Literature 2, a complex control is required to make the power exchange at a desired port to be zero. Thus, the loss due to the switching loss or the conduction loss at the switching circuit of the idled port is generated, which decreases the energy efficiency. On the other hand, with the power convertor 100 illustrated in FIG. 22, the current flowing through the third load resistance 8 is made zero by turning on the pair of switching elements on the lower arm of the third switching circuit 103 and turning off the pair of switching elements on the upper arm of the third switching circuit 103. This is because, as shown in the AC equivalent circuit of the power convertor 100 in FIG. 23, the ports 201, 202 and 203 are equivalently connected in series, and thus the third port 203 can equivalently shorted. On the other hand, with the multi-port converter having a plurality of wirings relative to a single isolation transformer, as illustrated in Non-Patent Literature 2, if the output terminal of the full bridge circuit is shorted similar to the present application, the voltage applied to the wirings of the isolation transformer becomes zero, which prevents the power exchange at the other ports. On the other hand, with the present application, the power exchange at the desired port (e.g., the third port 203 in FIG. 22) can be easily made zero by keep turning on either the switching elements on the upper arm or the switching elements on the lower arm, and the switching loss of the switching elements or switching circuit can be decreased. Thus, it is possible to provide a high efficiency circuit.

Figure 24:
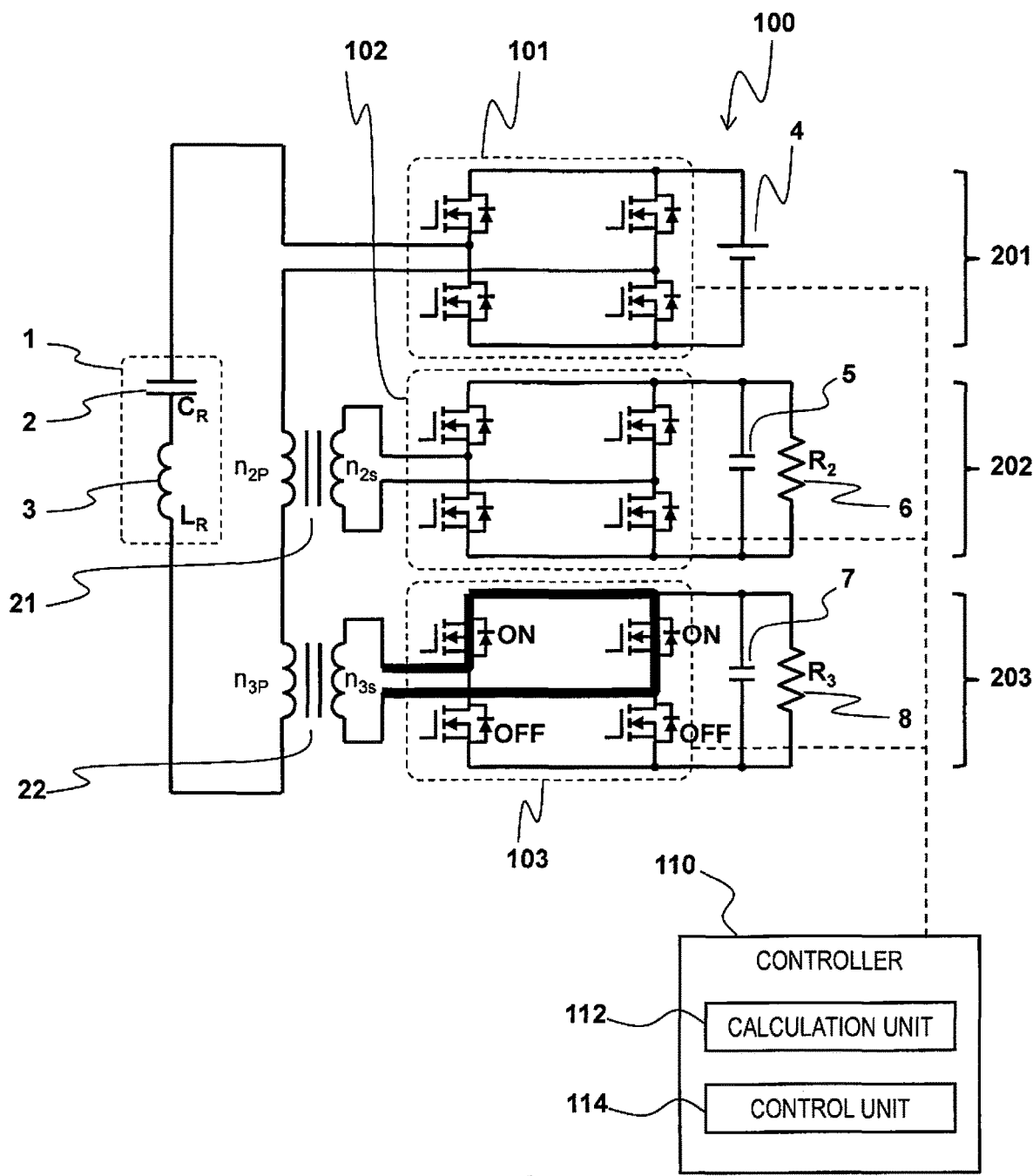
FIG. 24 is a circuit diagram illustrating a circuit structure of a power convertor in accordance with a modified example of the fifth embodiment.

FIG. 24 is a circuit diagram illustrating a circuit structure of a power convertor 100 in accordance with a modified example of the fifth embodiment. The power convertor 100 illustrated in FIG. 24 is basically identical to the power convertor 100 illustrated in FIG. 22. With the power converter 100 illustrated in FIG. 24, the pair of switching elements on the upper arm is turned on. Generally, the switching loss at the switching elements that have been turned on is zero, but the conduction loss is generated, which generates the heat. To prevent only one of the upper arm and the lower arms from being heated up, the state in which the lower arm is turned on and the state in which the upper arm is turned on are alternately switched for a predetermined interval. This disperses the generated heat, and lowers the required current rating of the switching elements. Thus, it is possible to provide a low-cost circuit.

In the illustrated embodiment, an example in which the output terminal of the third switching circuit 103 is electrically shorted has been explained. Of course, the output terminal of the second switching circuit 102 can also be electrically shorted in the same manner as explained above.

In the illustrated embodiment, with the power converter 100, the output terminal of third switching circuit 103 (e.g., at least one of the output terminals of the switching circuits) is electrically shorted via the switching elements of the upper arm or the switching elements of the lower arm in the third switching circuit 103.

With this power converter 100, the output terminal of the third switching circuit 103 is electrically shorted via the switching elements of the upper arm or the switching elements of the lower arm in the third switching circuit 103. Thus, the power input to the shorted output terminal and the power output from the shorted output terminal can be zero, thereby decreasing the loss at the switching element of the third switching circuit 103.

In the illustrated embodiment, with power converter 100, the output terminal of third switching circuit 103 (e.g., at least one of the output terminals of the switching circuits) is electrically shorted alternately via the switching elements of the upper arm and the switching elements of the lower arm in the third switching circuit 103.

With this power converter 100, the output terminal of third switching circuit 103 (e.g., at least one of the output terminals of the switching circuits) is electrically shorted alternately via the switching elements of the upper arm and the switching elements of the lower arm in the third switching circuit 103. Thus, the excessive temperature increase at the switching elements used for the short circuit can be prevented.

In the illustrated embodiment, with the power converter 100, the first, second and third switching circuits 101, 102 and 103 (e.g., at least one of the switching circuits) include a full bridge circuit.

With this power converter 100, the output terminal of the third switching circuit 103 can be easily electrically shorted by making the third switching circuit 103 include the full bridge circuit.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

It will be understood that, although the terms "first", "second", etc. may be used herein to describe various elements, components, regions, layers, positions and/or sections, these elements, components, regions, layers, positions and/or sections should not be limited by these terms. These terms are only used to distinguish one element, component, region, layer, position or section from another element, component, region, layer, position or section. Thus, a first element, component, region, layer, position or section discussed above could be termed a second element, component, region, layer, position or section without departing from the teachings of illustrative embodiments.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A power converter comprising:
   at least three switching circuits;
   at least one power source;
   at least one load; and
   a resonant circuit;
   a group of input terminals of the switching circuits that includes at least one of the input terminals being connected to the at least one power source,
   a reminder group of the input terminals of the switching circuits that includes at least one of the input terminals being connected to the at least one load, and
   output terminals of the switching circuits being electrically serially connected to the resonant circuit to form a closed circuit.

2. A power converter comprising:
   at least three switching circuits;
   at least one power source;
   at least one load; and
   a resonant circuit;
   input terminals of the switching circuits being connected to either the at least one power source or the at least one load,
   output terminals of the switching circuits being electrically serially connected to the resonant circuit to form a closed circuit, and
   the sum of fundamental component of voltage waveform generated by a set of the switching circuits that is connected to the at least one power source being substantially equal to the sum of fundamental component of voltage waveform applied to a set of the switching circuits that is connected to the at least one load.

3. The power converter according to claim 2, wherein the frequencies of the voltage waveforms are substantially equal to the resonant frequency of the resonant circuit.

4. The power converter according to claim 2, wherein the phases of the voltage waveforms are substantially equal to each other.

5. The power converter according to claim 1, wherein at least one of the output terminals of the switching circuits is serially connected to the closed circuit via an isolation transformer.

6. The power converter according to claim 1, wherein the characteristic impedance of the resonant circuit is higher than the total effective load resistance value serially connected to the closed circuit.

7. The power converter according to claim 1, wherein at least one of the output terminals of the switching circuits is electrically shorted via a switching element of an upper arm or a switching element of a lower arm in the switching circuit.

8. The power converter according to claim 7, wherein the at least one of the output terminals of the switching circuits is electrically shorted alternately via the switching element of the upper arm and the switching element of the lower arm in the switching circuit.

9. The power converter according to claim 7, wherein at least one of the switching circuits includes a full bridge circuit.

10. A power convertor comprising
    at least three switching circuits;
    at least one power source;
    at least one load;
    a resonant circuit; and
    an electronic controller including
        a calculation unit configured to calculate a load resistance value based on the applied voltage to the at least one load and the average current to the at least one load, and
        a control unit configured to determine the duty ratio of the switching circuits based on the load resistance value, the power source voltage value and the target voltage value to the at least one load,
    input terminals of the switching circuits being connected to either the at least one power source or the at least one load,
    output terminals of the switching circuits being electrically serially connected to the resonant circuit to form a closed circuit.

11. The power converter according to claim 8, Wherein at least one of the switching circuits includes a full bridge circuit.

12. The power converter according to claim 10, wherein at least one of the output terminals of the switching circuits is electrically shorted via a switching element of an upper arm or a switching element of a lower arm in the switching circuit,
    the at least one of the output terminals of the switching circuits is electrically shorted alternately via the switching element of the upper arm and the switching element of the lower arm in the switching circuit, and
    at least one of the switching circuits includes a full bridge circuit.

13. The power converter according to claim 2, further comprising
    an electronic controller including
        a calculation unit configured to calculate a load resistance value based on the applied voltage to the at least one load and the average current to the at least one load, and
        a control unit configured to determine the duty ratio of the switching circuits based on the load resistance value, the power source voltage value and the target voltage value to the at least one load.

14. The power converter according to claim 2, wherein at least one of the output terminals of the switching circuits is serially connected to the closed circuit via an isolation transformer.

15. The power converter according to claim 2, wherein the characteristic impedance of the resonant circuit is higher than the total effective load resistance value serially connected to the closed circuit.

16. The power converter according to claim 2, wherein at least one of the output terminals of the switching circuits is electrically shorted via a switching element of an upper arm or a switching element of a lower arm in the switching circuit.

17. The power converter according to claim 16, wherein the at least one of the output terminals of the switching circuits is electrically shorted alternately via the switching element of the upper arm and the switching element of the lower arm in the switching circuit.

18. The power converter according to claim 16, wherein at least one of the switching circuits includes a full bridge circuit.

19. The power convertor according to claim 3, further comprising
a controller including
a calculation unit configured to calculate a load resistance value based on the applied voltage to the at least one load and the average current to the at least one load, and
a control unit configured to determine the duty ratio of the switching circuits based on the load resistance value, the power source voltage value and the target voltage value to the at least one load.

\* \* \* \* \*

UNITED STATES PATENT AND TRADEMARK OFFICE
CERTIFICATE OF CORRECTION

PATENT NO. : 10,778,110 B2
APPLICATION NO. : 15/767373
DATED : September 15, 2020
INVENTOR(S) : Shigeharu Yamagami et al.

It is certified that error appears in the above-identified patent and that said Letters Patent is hereby corrected as shown below:

In the Claims

Column 17, Line 22, cancel the text beginning with "1. A power converter comprising:" to and ending "a closed circuit." in Column 17, Line 35, and insert the following Claim 1:

--1. A power converter comprising:
 at least three switching circuits configured to be operated to convert between DC and AC;
 at least one DC power source;
 at least one load; and
 a resonant circuit;
 DC-side terminals of at least one first switching circuit of the switching circuits being connected to the at least one DC power source,
 DC-side terminals of at least one second switching circuit of the switching circuits being connected to the at least one load, and
 AC-side terminals of the at least one first switching circuit and the at least one second switching circuit of the switching circuits being electrically serially connected to the resonant circuit to form a closed circuit.--

Column 17, Line 36, cancel the text beginning with "2. A power converter comprising:" to and ending "equal to each other." in Column 17, Line 59, and insert the following Claims 2-4:

--2. A power converter comprising:
 at least three switching circuits configured to be operated to convert between DC and AC;
 at least one DC power source;
 at least one load; and
 a resonant circuit;
 DC-side terminals of at least one first switching circuit of the switching circuits being connected to the at least one DC power source,
 DC-side terminals of at least one second switching circuit of the switching circuits being connected to the at least one load, Signed and Sealed this
Twenty-fourth Day of January, 2023

Katherine Kelly Vidal
*Director of the United States Patent and Trademark Office*

CERTIFICATE OF CORRECTION (continued)
U.S. Pat. No. 10,778,110 B2

AC-side terminals of the at least one first switching circuit and the at least one second switching circuit of the switching circuits being electrically serially connected to the resonant circuit to form a closed circuit, and the sum of fundamental component of first voltage waveform generated by the at least one first switching circuit being equal to the sum of fundamental component of second voltage waveform applied to the at least one second switching circuit.

3. The power converter according to claim 2, wherein
the first and second voltage waveforms have frequencies that are equal to the resonant frequency of the resonant circuit.

4. The power converter according to claim 2, wherein
the first and second voltage waveforms have phases that are equal to each other.--

Column 17, Line 60, cancel the text beginning with "5. The power converter according to claim 1, wherein" to and ending "of the lower arm in the switching circuit." in Column 18, Line 10, and insert the following Claims 5-8:

--5. The power converter according to claim 1, wherein
at least one pair of the AC-side terminals of the at least one first switching circuit and the at least one second switching circuit is serially connected to the closed circuit via an isolation transformer.

6. The power converter according to claim 1, wherein
the resonant circuit has characteristic impedance that is higher than the sum of effective load resistance value of equivalent resistance of at least one port, with the equivalent resistance of the at least one port being serially connected to the closed circuit in an equivalent circuit of the power converter, with the at least one port including the at least one load and the at least one second switching circuit.

7. The power converter according to claim 1, wherein
the AC-side terminals of at least one of the at least one first switching circuit and the at least one second switching circuit are electrically shorted with each other via a switching element of an upper arm or a switching element of a lower arm in the at least one of the at least one first switching circuit and the at least one second switching circuit.

8. The power converter according to claim 7, wherein
the AC-side terminals of the at least one of the at least one first switching circuit and the at least one second switching circuit are electrically shorted with each other alternately via the switching element of the upper arm and the switching element of the lower arm in the at least one of the at least one first switching circuit and the at least one second switching circuit.--

Column 18, Line 14, cancel the text beginning with "10. A power converter comprising" to and ending "circuit." in Column 18, Line 36, and insert the following Claims 10 and 11:

--10. A power converter comprising:

at least three switching circuits configured to be operated to convert between DC and AC;
at least one DC power source;
at least one load;
a resonant circuit; and
an electronic controller including
a calculation unit configured to calculate a load resistance value based on an applied voltage applied to the at least one load and an average current flowing through the at least one load, and
a control unit configured to determine a duty ratio of the switching circuits based on the load resistance value, a voltage value of the at least one DC power source and a target voltage value applied to the at least one load,
    DC-side terminals of at least one first switching circuit of the switching circuits being connected to the at least one DC power source,
    DC-side terminals of at least one second switching circuit of the switching circuits being connected to the at least one load,
    AC-side terminals of the at least one first switching circuit and the at least one second switching circuit of the switching circuits being electrically serially connected to the resonant circuit to form a closed circuit.

11. The power converter according to claim 8, wherein
    at least one of the switching circuits includes a full bridge circuit.--

Column 18, Line 37, cancel the text beginning with "12. The power converter according to claim 10, wherein" to and ending "serially connected to the closed circuit." in Column 18, Line 66, and insert the following Claims 12-15:

--12. The power converter according to claim 10, wherein
    the AC-side terminals of at least one of the at least one first switching circuit and the at least one second switching circuit are electrically shorted with each other alternately via a switching element of an upper arm and a switching element of a lower arm in the at least one of the at least one first switching circuit and the at least one second switching circuit, and
    at least one of the switching circuits includes a full bridge circuit.

13. The power converter according to claim 2, further comprising
    an electronic controller including
a calculation unit configured to calculate a load resistance value based on an applied voltage applied to the at least one load and an average current flowing through the at least one load, and
a control unit configured to determine a duty ratio of the switching circuits based on the load resistance value, a voltage value of the at least one DC power source and a target voltage value applied to the at least one load.

14. The power converter according to claim 2, wherein
    at least one pair of the AC-side terminals of the at least one first switching circuit and the at least one second switching circuit is serially connected to the closed circuit via an isolation transformer.

15. The power converter according to claim 2, wherein the resonant circuit has characteristic impedance that is higher than the sum of effective load resistance value of equivalent resistance of at least one port, with the equivalent resistance of the at least one port being serially connected to the closed circuit in an equivalent circuit of the power converter, with the at least one port including the at least one load and the at least one second switching circuit.--

Column 19, Line 1, cancel the text beginning with "16. The power converter according to claim 2, wherein" to and ending "of the lower arm in the switching circuit." in Column 19, Line 10, and insert the following Claims 16 and 17:

--16. The power converter according to claim 2, wherein
    the AC-side terminals of at least one of the at least one first switching circuit and the at least one second switching circuit are electrically shorted with each other via a switching element of an upper arm or a switching element of a lower arm in the at least one of the at least one first switching circuit and the at least one second switching circuit.

17. The power converter according to claim 16, wherein
    the AC-side terminals of the at least one of the at least one first switching circuit and the at least one second switching circuit are electrically shorted with each other alternately via the switching element of the upper arm and the switching element of the lower arm in the at least one of the at least one first switching circuit and the at least one second switching circuit.--

Column 19, Line 14, cancel the text beginning with "19. The power converter according to claim 3, further" to and ending "voltage value to the at least one load." in Column 19, Line 24, and insert the following Claim 19:

--19. The power convertor according to claim 3, further comprising
    a controller including
a calculation unit configured to calculate a load resistance value based on an applied voltage applied to the at least one load and an average current flowing through the at least one load, and
a control unit configured to determine a duty ratio of the switching circuits based on the load resistance value, a voltage value of the at least one DC power source and a target voltage value applied to the at least one load.--